US006976635B2

(12) United States Patent
Ashizawa et al.

(10) Patent No.: US 6,976,635 B2
(45) Date of Patent: Dec. 20, 2005

(54) METHOD OF PROVIDING IC CARD SERVICE, CARD TERMINAL, AND IC CARD

(75) Inventors: Minoru Ashizawa, Tokyo (JP); Yusuke Mishina, Kunitachi (JP); Masaru Ohki, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 37 days.

(21) Appl. No.: 09/791,618

(22) Filed: Feb. 26, 2001

(65) Prior Publication Data

US 2002/0134843 A1 Sep. 26, 2002

(30) Foreign Application Priority Data

Jan. 19, 2001 (JP) ....................................... 2001-011709

(51) Int. Cl.[7] ................................................ G06K 19/06
(52) U.S. Cl. ....................................... 235/492; 235/375
(58) Field of Search ................................ 235/375, 492, 235/379–382; 705/17, 41

(56) References Cited

U.S. PATENT DOCUMENTS

| | | | | | |
|---|---|---|---|---|---|
| 5,763,862 | A | * | 6/1998 | Jachimowicz et al. | 235/380 |
| 5,878,134 | A | | 3/1999 | Handelman et al. | |
| 5,979,773 | A | * | 11/1999 | Findley et al. | 235/492 |
| 6,112,985 | A | | 9/2000 | Weinlaender | |
| 6,164,549 | A | | 12/2000 | Richards | |
| 6,367,696 | B1 | * | 4/2002 | Inamitsu et al. | 235/381 |
| 6,425,522 | B1 | * | 7/2002 | Matsumoto et al. | 235/380 |
| 6,575,835 | B1 | | 6/2003 | Mishina et al. | |
| 2002/0058534 | A1 | | 5/2002 | Durand et al. | |

FOREIGN PATENT DOCUMENTS

| | | |
|---|---|---|
| DE | 4201197 | 7/1993 |
| DE | 29608642 | 8/1996 |
| EP | 0081921 | 6/1983 |
| EP | 0936583 | 8/1999 |
| EP | 1065633 | 1/2001 |
| GB | 2 343 091 | 4/2000 |
| WO | 98/27519 | 6/1998 |
| WO | 00/70567 | 11/2000 |
| WO | 00/75882 | 12/2000 |
| WO | 01/04851 | 1/2001 |

* cited by examiner

*Primary Examiner*—Diane I. Lee
*Assistant Examiner*—Jamara A. Franklin
(74) *Attorney, Agent, or Firm*—Mattingly, Stanger, Malur & Brundidge, P.C.

(57) ABSTRACT

There have been some problems in the conventional IC card such as a card holder has to memorize his PIN, the set of conditions for the combination of IC cards has been impossible, a self-governing body has been unable to issue a resident cart for the utilization of public facilities to a resident in the neighboring self-governing body.

In the present invention, an attribute-information storage means for an associated-IC-card application is provided in a first IC card for storing attribute information of the IC-card application of a second IC card, and the list of selectable IC-card applications is displayed based on the reliance relation predicated on attribute information and the selection by users can be accepted. Owing to the present invention the following can be realized: the memorization of one's PIN is not needed, in the point service in the shopping district, points can be doubled by a certain combination condition of IC cards, the issue of an IC card by a self-governing body is made possible on condition that a resident has his resident card issued by the neighboring self-governing body, and it is made possible to electronically process the administration entries which require a plurality of documents to be attached.

20 Claims, 19 Drawing Sheets

16001 16002 16003 16004

| # | NAME OF IC-CARD APPLICATION | ATTRIBUTE INFORMATION OF ASSOCIATED -IC-CARD APPLICATION | CONFIRMATION TYPE |
|---|---|---|---|
| 1 | | | |
| 2 | | | |
| 3 | | | |
| | | | |

| # | NAME OF IC-CARD APPLICATION | IC-CARD CONNECTION # (ICC) | ATTRIBUTE INFORMATION OF IC-CARD APPLICATION (Attr) | ATTRIBUTE INFORMATION OF ASSOCIATED IC-CARD APPLICATION (LnkAttr) | CONFIRMATION TYPE (Type) | ASSOCIATION LINK | | EXECUTABLE FLAG (Exe) | USER SELECTION FLAG (Sel) |
|---|---|---|---|---|---|---|---|---|---|
| | | | | | | FORWARD (FLnk) | REVERSE (RLnk) | | |
| 1 | | | | | | | | | |
| 2 | | | | | | | | | |
| 3 | | | | | | | | | |
| | | | | | | | | | |

METHOD OF PROVIDING IC CARD SERVICE, CARD TERMINAL, AND IC CARD

BACKGROUND OF THE INVENTION

1. Field of the Invention

The present invention relates to a method of providing a service utilizing a portable electronic authentication means such as an IC card (smart card). More specifically, the present invention relates to an IC card terminal and an IC card which make the above-mentioned services possible.

2. Related Art

IC cards have been issued to those who desire the utilization of IC-card services and an IC-card application corresponding to the desired service is stored in the IC card. In this case, the holder of the IC card is naturally able to utilize the card, but in order to show that he is a right holder, it is necessary for him to memorize his personal identification number and when he utilizes a service, he has to input his personal identification number onto an IC-card terminal.

For the contents of an IC-card service, there are some kinds of services which use a plurality of IC-card applications such as the point service in a shopping district or the settlement of a David credit.

In a case, there are many kinds of utilizing ways as shown below: a self-governing body issues resident cards and they can be used as identifications and also there are other utilization method such as IC-card applications for utilizing public facilities can be stored in resident cards.

In some self-governing bodies, the seal certificate has been formed in the form of an IC card and the entry of an issue request of one's seal certificate is electronically performed without asking it to a clerk at the window.

The IC-card application according to the present invention is expressed by a file in the case of ISO7816 or JICSAP standard and is expressed by a program and data in the case of Javacard standard or MULTOS standard. In the former, various kinds of data are stored in a card memory and the operation is performed by a program in the IC-card terminal, and in the latter, a card has a program and data.

According to the present invention, when one receives various kinds of services, the necessary data, etc. for receiving services are stored in a plurality of cards and these cards are used in association. Thus the loads of users are largely lightened.

A conventional card has had a disadvantage that an IC-card holder is required to memorize his personal identification number, but sometimes he forgets it or because the number can be easily guessed by others the number does not work as a personal identification number.

A first object of the present invention is to make a card holder free from memorizing his personal identification number and yet to make it possible to provide a means for certifying that he is the right holder of the card.

There is a demand to diversify the contents of a point service in the shopping district using an IC card of a conventional type and also a demand for seizing and enclosing customers in the district by providing some conditions. As an example of diversification of services and conditions following can be considered: for the purpose of giving incentives to purchasing volition of customers, they are recommended to have a plurality of cards for accumulating a plurality of kinds of points and the points can be doubled under some conditions of combinations of IC cards. There has been a disadvantage in the conventional technique that it has been impossible to set conditions about the combination of IC cards.

A second object of the present invention is to provide a means for setting conditions about IC cards.

There has been a disadvantage as mentioned below in the reservation for utilizing public facilities with a conventional resident card issued by a self-governing body. Even when a resident in the neighboring self-governing body other than the one managing public facilities desires to utilize the facilities, the resident card in the neighboring self-governing body is unable to store the IC-card application necessary for the utilization of the public facilities. It is also impossible to issue a resident card which is able to store the application from the viewpoint of the system; therefore, it has been impossible to form the resident card in the form of an IC card which enables the utilization of public facilities by a resident in the neighboring self-governing body.

A third object of the present invention is, presupposing that one has his resident card of a neighboring self-governing body, to provide a means which enables the issue of an IC card for utilizing the public facilities.

In some case, for an entry to the window of a self-governing body, the appending of a document issued by another window is needed. In such a case, if the entry or the document is electronically processed, it is necessary to designate electronically the electronic document to be added to the electronic entry and to inspect them promptly if there is any mistake or omission in the entry documents at the receipt of the documents; however, the method of executing the inspection is not clearly decided.

A fourth object of the present invention is, in a case where the entry and the document to be appended are realized by an IC-card application, to provide a means to enable to show the document to be appended electronically and to quicken the inspection of the entry documents when they are received at the window.

SUMMARY OF THE INVENTION

According to a first aspect of the present invention, at least two IC cards can be connected to an IC card terminal, the IC cards being connected electrically or electromagnetically to each other, a first card in the above-mentioned plurality of IC cards has at least a first application and a second card in the above-mentioned plurality of IC cards has at least a second application, and each of these two cards concerns a different function from each other. The card terminal obtains at least the first application of the first card and the necessary information for the first application owned by the second application, and IC-card services are provided based on the above information.

According to a second aspect of the present invention, at least two IC cards can be connected to an IC card terminal, the IC cards being connected electrically or electromagnetically to each other, a first card in the above-mentioned plurality of IC cards has at least a first application and a second card in the above-mentioned plurality of IC cards has at least a second application, each of these two cards concerns a different function from each other, the card terminal obtains at least the first application owned by the first card and the information owned by the second card, the information being necessary for the first application, judges the correspondence with an application owned by a different IC card from the first card, the different IC card application operating in association with the application owned by the first IC card, and based on the result of judgment the card terminal selects a designated service to provide the service.

According to a third aspect of the present invention, the provision of services by the card terminal is performed by the operation of a program stored in the terminal or a program owned by a server connected to the terminal based on the first application owned by the first card and the information owned by the second card and necessary for the first application.

According to a fourth aspect of the present invention, it is possible to set the application variably which is owned by a different IC card from the first IC card, the different IC operating in association with the application owned by the first card.

According to a fifth aspect of the present invention, it is possible to select the application owned by a different IC card from the first card, the different IC card operating in association with the application owned by the first card.

According to a sixth aspect of the present invention, it is possible to select an application which operates in association with the application owned by the first card from among a plurality of applications owned by a different IC cards from the first card.

The present invention provides an IC card terminal which is able to realize the providing method of IC-card services as mentioned in the above, and also provides IC cards which can be used for the above IC-card terminal.

BRIEF DESCRIPTION OF THE DRAWINGS

FIG. 17 shows the configuration of the associated-IC-card-application list to be used in the present invention;

DETAILED DESCRIPTION OF THE INVENTION

Figure 1:
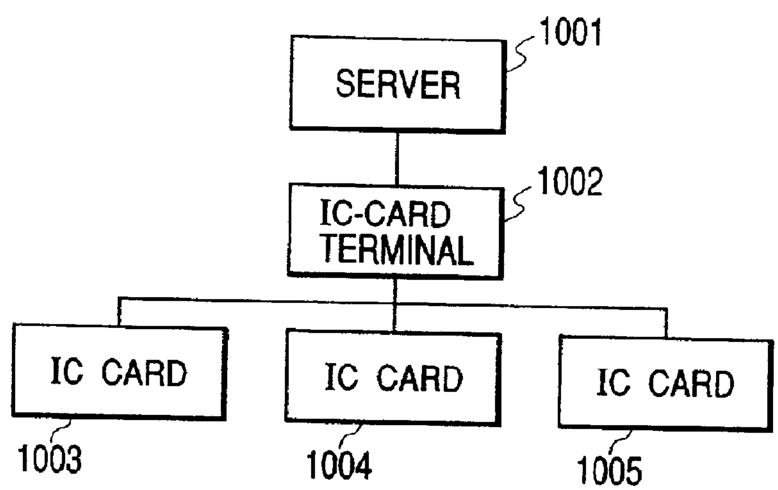
FIG. 1 shows a block diagram showing the configuration of an IC card service system according to the present invention.

The details of embodiments according to the present invention will be made clear in the following; however in the heading part, a representative example will be shown below.

A fundamental system concerning the present invention comprises a plurality of IC cards and an IC-card terminal for executing services. In many cases the IC-card terminal and a server, etc. which interlinks with the above IC-card terminal have a computer program for executing the service. In some case, an IC card has a desired program in its inside. Components for a fundamental system are constituted as desired using existing parts. Supposing that a first IC card for utilizing IC card services stores a first IC-card application, and apart from this a second IC card stores a second IC-card application, an associated-IC-card-application-attribute-information-storage means for storing the attribute information of the second IC card and/or the attribute information of the second IC-card-application is provided in the first IC card, and/or a private-identification-number-storage means to be used for the utilization of the first IC-card application is provided in the second IC card.

Further, the details of an example of the providing method of the IC-card services according to the present invention comprise the respective steps as shown below.

(1) A step of obtaining an IC-card-application list for obtaining an IC-card-application list of every IC card;

(2) An associated-IC-card-application-attribute-information-collation steps: a step of obtaining an associated-IC-card-application-attribute-information for obtaining the attribute information stored in the associated-IC-card-application-attribute-information-storage means of every IC card; a step of judging if the second IC card which coincide with the attribute information stored in the associated-IC-card-application-attribute-information-storage means is connected electrically or electromagnetically to an IC-card terminal through the analysis of reliance based on the attribute information stored in the associated-IC-card-application-attribute-information-storage means, and/or a step of judging if the second IC card application which coincide with the attribute information is stored in the first IC card or in the second IC card;

(3) An associated IC-card-applications-narrowing steps: an associated-IC-card-application-list-composition step of producing an IC-card-application list by composing IC-card-application lists obtained from every IC card and a step of displaying an optional IC-card-application list and accepting the selection based on the reliance predicated upon the attribute information stored in the associated-IC-card-application-attribute-information-storage means of respective IC cards.

(4) An associated-IC-card-application-availability-confirmation step: before the execution of a first IC-card application following steps will be performed: a step of inquiring a server about the availability of the second IC card to a server utilizing the IC-card-availability-confirmation information stored in the associated-IC-card-attribute-information-storage means inside the first IC card, and/or a step of inquiring the server about the availability of the second IC-card application utilizing the IC-card-application-availability-confirmation information stored in the associated-IC-card-program-attribute-storage means inside the first IC card.

(5) A step of obtaining PIN: while one is waiting for a key input of his PIN, he obtains information from the second IC card, and the obtained information is regarded that the key input of the PIN by the holder has been done;

(6) A step of creating random numbers in which the first IC card is made to create random numbers;

(7) A step of making out a certificate in which the second IC card is made to make a certificate using the information proper to the second IC card by transmitting one of the above-mentioned random numbers to the second IC card;

(8) A step of verifying the certificates:
certificates mentioned in the above are transmitted to the first IC card for verification.

Further, there are steps as shown below in the method of issue of IC card applications:

(1) a step of designating a target of association in which as a target of association of an IC-card application stored in the first IC card, the second IC card and/or the IC card application stored in the second IC card is designated;

(2) a step of extracting the attribute information of a target of association in which as the attribute information of a target of association, attribute information of an IC card and/or attribute information of an IC-card application are extracted from the second IC card;

(3) a step of injecting attribute information of associated IC-card applications in which the extracted attribute information of the target of association is stored in the storage means of associated-IC-card-application-attribute information in the first IC card.

The present invention provides a method of utilization of IC cards which enables to execute a designated function utilizing at least two different functions owned by IC cards using two sheets of IC cards.

For example, a plurality of cards, for example, two cards are used and each of them is given different functions, these plurality of functions work in association with each other and performs a designated operation.

In this place, "the function owned by an IC card" means the contents of various kinds of services which are provided by IC cards. These words are terms which includes programs for executing services and various kinds of data housed in IC cards.

The contents of services spread to a variety of fields. For example, the following can be cited; however the following are only examples of services which the present invention is able to provide:

(1) a service of acting for another to input PIN (Personal Identification Number);

(2) services of performing the sale of electronic tickets, the issue of electronic certificates, the sales of electronic newspapers, etc., and the settlements of their accounts. In other words, the services of intending to perform the settlements of accounts for the above-mentioned sales and issue by optional various kinds of settlement methods with IC cards;

(3) point services and the settlements of accounts: that is the services of intending to perform settlements for these point services by optional various kinds of settlement methods with IC cards;

(4) entry to administration a first example of the entry to administration: an application is submitted to a first administrative window and without submitting an issued certificate to the second administrative window, a desired administrative process is performed with a series of services;

a second example of the entry to administration: about electronic certificates handled by administration, there is a request of designating a necessary certificate by, for example, formats or issue organ. In some case, an administrative office designates the method of payment. The present example shows a service which enables to process the issue and the payment of a certificate by a series of business;

(5) Wide area services by a self-governing body: in a case where a resident in a self-governing body A desires a service utilizing an application owned by an IC card issued by a self-governing body B, he will be able to have the service using his ID card issued by self-governing body A.

In order to realize the above-mentioned service, an example of various kinds of data stored in the IC card are shown in the following. For example, a card ID of an IC card, a card holder ID (inherent to the holder), AID (Application Identifier), the manufacturer's name of an application, the issuer's name of an application: RID (Registered Application Provider Identifier), the card manufacturer's ID, the name of a card issuer, the ID of a card issuer, etc. can be cited.

According to the present invention, a plurality of cards are used, and using a plurality of functions among the functions stored in each of these plurality of cards, a desired service can be executed. In a case where such a plurality of cards are utilized, these plurality of cards have to be designated, and the applications stored in these plurality of cards have to be designated.

For the information of designation of a target card, for example, a card ID, a card holder ID, a manufacturer's name or a manufacture ID, an issuer's name or an issuer ID, etc. can be used. Naturally, the combination of a plurality of these can be used.

For the information of designating a service to be loaded on a card, for example, an application's name, application ID, a manufacturer's name or a manufacture ID, an issuer's name or an issuer ID, etc. can be used properly. Naturally, the combination of a plurality of these can be used.

As a realistic method, proper methods for designating a target for association of the above-mentioned plurality of cards can be arranged as shown in Table 1.

TABLE 1

| | Specified contents | Information to be used for designation of target card | Information to be used for designation of target application |
|---|---|---|---|
| 1 | Fixed | (1C) Card ID, card holder ID, etc. | (1A) AP name, AP ID (AID) |
| 2 | Conditional | (2C) Manufacturer name, issuer name, manufacturer ID, issuer ID, etc. | (2A) Manufacturer name, issuer name, manufacturer ID, issuer ID, AP name or kind, etc. |
| 3 | Unconditional | (3C) Card responds unconditionally. | (3A) AP responds unconditionally. |

A first case shows a case where there are, plurality of cards, for example, two cards and the services to be executed are fixed.

Such examples are shown in the following. In a case where a desired service is, for example, at a government office or at a city office a resident is able to require a resident card with an IC card, ID cards are distributed to all target residents. When the IC card is used, naturally, a resident has to memorize his PIN (Personal Identification Number) for certifying the user himself. However, a case, where a user does not memorize his PIN well can be considered, the PIN which certify the user himself. According to the present invention, in such a case, apart from an IC card which executes service, another card storing his PIN can be used. Thus a first IC card which executes services and a second IC card storing his PIN are used as a fixed couple. Owing to this, one does not need to memorize his PIN at any time. In the above, an example of an administration service is described; however the present example is possible to apply to general services simply.

When a plurality of IC cards are loaded on a card terminal, it becomes necessary to designate a target IC card. For such a demand, for example, the attribute information of the card can be used. As attribute information of an IC card, the discrimination number of an IC card (a card ID), an IC card public key, a card holder's name or card holder's discrimination number (a card holder ID), the issuer's name of an IC card or the discrimination number of an IC card issuer, a card manufacturer's name or the discrimination number of a card manufacturer, etc. can be cited. It is also possible to use one or more than two of these.

Further it is necessary to specify an application concerning the execution of a service for the execution of services according to the present invention. For the designation the name of a card application or the discrimination number of a card application (AID: application identifier), etc. are used.

When the object of usage is a fixed one, a representative example of operation is shown below.

A first IC card is connected to a card terminal electrically or electromagnetically. The connection means an electrical or electromagnetic connection and it does not necessarily require a mechanical contact. Needless to say, by moving an IC card in the vicinity of a card terminal, the object of connection can be achieved. When the first IC card is a card which urges the operation of the card terminal, a program corresponding to a designated service starts to operate, the program being owned by the card terminal or the server which interlinks with the above card terminal.

An user is requested for data or a further program necessary to execute the service. This requirement is, generally, expressed by the use of a display. In some case, key input is enabled by an instruction based on the display. After a program specified by a user is executed, and when a further IC card is needed, process stops, and a message requiring another IC card is displayed.

In correspondence to the above-mentioned requirement, the user connects the second IC card to the card terminal electrically or electromagnetically. In this place the connection expresses naturally the same meaning as described in the previous page. In this explanation the second card is separated time-wise, but in some system configuration, a plurality of IC cards can be connected to the card terminal beforehand. In correspondence to the requirement from the card terminal, a second IC card provides data or a further program for executing the services. The data for executing the services mean, for example, in a most simple example, a person who obtains the service or information for confirming a card, that is, a discrimination number, PIN, etc. The information from the second IC card is generally sent to the IC card terminal.

On receiving the information for confirmation about a person who receives the service or a card from the second card, the card terminal confirms whether the information is that having availability or not. When the availability of the above is confirmed by the confirmation operation, a concrete service is executed. In some case, the above information for confirming a person who receives a service or a card from the second card can be executed in the first card. In this case, the above information is transmitted to the first IC card from the second IC card, and a confirmation operation is performed inside the first card. The result is sent to the card terminal from the first IC card. When the availability is confirmed, a concrete service is executed.

However in general, the transmission and reception of signals between the IC card and the card terminal are performed in code. At this time, in some case, the information for confirming a person who receives the service is coded with the use of random numbers. A case where the random numbers used at this time are prepared inside the second IC card, another case where they are transmitted from the card terminal to the second IC card, and other various kinds of methods can be considered. In any way, the above-mentioned information of the second IC card is coded with random numbers and transmitted to the card terminal.

The important thing in the present invention is in that the necessary information for the execution of a service which is intended by the first IC card to provide is provided by the second IC card, and after the confirmation of the information by the system concerned, the service is executed.

Further after a card is specified, it is necessary to designate an application concerning a service to be executed. For the above-mentioned designation, the name of a card application or the discrimination number AID, etc. are used.

A second case is a case where there is a condition for a usable card. The condition means that, for example as general consideration, the case where the judgment if an application stored in an IC card is able to provide a desired service or not is made by the provider of the application. A concrete example will be cited below. As a concrete example of an organ which should judge whether a desired service can be provided or not, the organs who provide various kinds of credit services can be cited. A service system selects an organ which is able to provide a desired service from among many organs. In some case a plurality of organs are able to provide the desired service. In this case, the attribute information of an IC card to be used for the designation of an IC card and the attribute information of an application to be used for the designation of an application are the same as examples described in the above.

A third case is a case where it is possible to designate a target card which is able to associate unconditionally. In this case, when a designated card is loaded on a card terminal it can be operated by a reset signal, and the operating application responds unconditionally.

Next, a realistic method for designating a plurality of applications owned by an IC card to operate in association with each other is shown in Table 2. The examples shown in this table show specifying methods of target cards and specifying method of target applications which are easy to use. In some configuration method of a system, it is naturally possible to adopt other specifying methods. Symbols such as (2A) or (3C) in Table 2 express the specifying methods of a card or an application shown in Table 1.

TABLE 2

| | Example of service | Information for designating target card | Information for designating target application |
|---|---|---|---|
| 1 | PIN card | 1C, 3C | 1A, 3A |
| 2 | Service and settlement of account | 1C, 2C, 3C | 1A, 2A, 3A |
| 3 | Point service and settlement of account | 1C, 2C, 3C | 1A, 2A, 3A |
| 4 | Entry to administration | 1C, 2C, 3C | 1A, 2A, 3A |
| 5 | Wide-range service of self-governing body | 1C | 1A |

Next, the flow of process of services will be briefly explained. The details of it will be explained in those embodiments described below.

(1) The Designation of Correspondence Conditions of Functions of an IC Card (Applications, Attribute Information, etc.)

Before the issue or at the time of issue, the correspondence conditions of IC cards and the applications are decided. The data of the correspondence conditions are stored in an IC card or in a server. In a case where after the issue of an IC card an application is to be issued, there is a case where the data of correspondence conditions are extracted from an IC card on the requested side for association.

(2) Confirmation of Availability of an IC Card and Applications

It is necessary to make inquires of an issuer about the availability of IC cards, applications, etc. When an IC card or an application is unavailable, naturally a service concerned is unable to be executed.

In some cases of services, a method as shown in the following is possible: at the time of issue of an application, the information for the confirmation of availability of an associated IC card is extracted and stored and the availability of an application for a service can be confirmed without the presence of the associated IC card.

(3) Narrowing of Applications, etc.

Applications which can be operated in association are narrowed based on the condition data stored in the above item (1). Thus the correspondence relations among a plurality of applications which are able to operate in association are made clear, and an application is selected which will be actually executed. When the narrowing operation is not sufficiently performed by only the side of equipment, the narrowing operation by a person can be used in combination.

(4) In the case of execution of a concrete service, a means for preventing the loss of data, illegal reproduction or duplication is devised. For this measure itself, a conventional technique, for example, that of electron money will do the job. For example, the exchange of data among applications is performed.

<Examples of Representative Services>

Next, some examples of representative services according to the present invention will be explained in the following.

Figure 18:
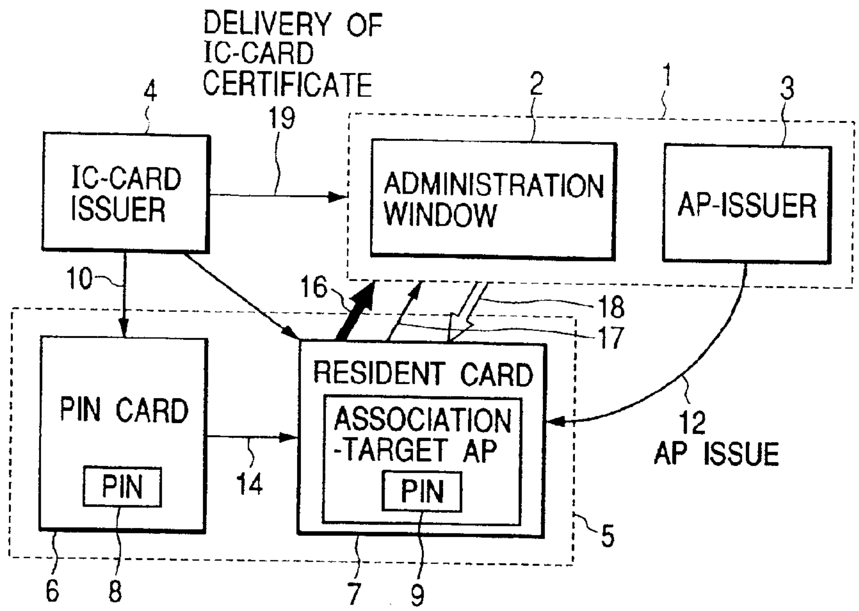
FIG. 18 shows a block diagram showing an example of a service using a PIN card.

A first example is that of a PIN card. FIG. 18 shows a block diagram showing an example of a service of a PIN card. It is an example of an administration service at a city office. It is the example of the application and issue of documents such as a resident card or a certified copy of one's family register. In this case, a resident card, a certified copy of one's family register and so on show only some examples of an administration service, and naturally the present invention can be applied to other various kinds of administration services. A card user 5 shows an example in which he uses two IC cards, that is a first card, resident card 7, and a second card, a PIN card 6 which work in association with each other. An administration window of an administration service, that is, a service provider 2 and an application issue section 3 which issues the application to be used for executing the administration service are shown in the city office 1.

The second card, a PIN card 6, is issued by an IC card issuer 4. The IC card issuer 4 is shown as a separate organ in the IC card system according to the present invention. This organ can take a variety of forms: it can be a section directly governed by the city office or it can be an organ assigned by the city office. The form of the organ will not give any influence to the fundamentals of execution of the present invention. When one obtains a service with an IC card at the administration window 2 or obtain an application, the IC card issuer 4 makes contact to the administration window 2 about a delivery certificate of the IC card. The delivery certificate is to verify the justification of the card. This contact is, at present in many cases, performed on-line. Of course there are other methods. The information is formed with a numeral string, a character string or a combined information of them.

The case where this service is executed by the first method of "fix" will be explained.

In the first IC card, that is, a resident card, the attribute information of the first card and the attribute information of the first-card application can be stored. In other words, the first card comprises a storage means for attribute information of applications of associated IC cards. The attribute information in a card is, for example, the PIN of a holder. For the PIN itself, an ordinary one which is used in this field suffices. For the attribute information of a card application, for example, the name of the application or application ID can be used.

The first card, that is a resident card 7 is issued by an IC card issuer 4. The present example is the one in which the IC card issuer 4 issues the first card; however, as card issuers many other forms can be considered such as a section governed by the administration organ 1. In any case, there is no substantial difference in the execution of the present invention. A user 5 requires beforehand the issue of an application for the provision of service to the service issue section 3 in the administration organ 1, and stores the application in the second card. At this time, at least the attribute information of the card application is attached, the information which designates that the application is the association target IC of the first card.

A user 5 applies the provision of a service, for example, the issue of his resident card at the administration window 2. In this case, the first card and the second card, 6 and 7, are made to access a card terminal. In other words, each of these IC cards is connected to the IC card terminal electrically or electromagnetically. And as in the explanation described in the operation example of a fixed service, the program for the service concerned of a terminal in the administration window 2 is started to operate by a program or a signal of the first IC card. The terminal obtains, for example, a PIN corresponding to a target application from the first IC card and stores it.

The PIN of the user 5 is sent (17) to the administration window 2, to be concrete, to the terminal in the administration window 2 from a PIN card of the second card. The PIN is, generally, coded with random numbers as mentioned in the previous page. The terminal confirms the availability of the received PIN. The PIN received from the second IC card is verified with the PIN from the first IC card. When the verification is confirmed, the service concerned is executed (18).

Further, it is also possible to execute this service in the third "unconditional" form.

A second example is that of an administration entry. This is, for example, of a case where one applies the delivery of a his seal certificate, a certified copy of register or a certified copy of one's family register to a designated government office, and submit the obtained document to the other window of the government office of course, it is possible to apply the present invention to the case where one applies the delivery of other documents than those described in the above.

Figure 19:
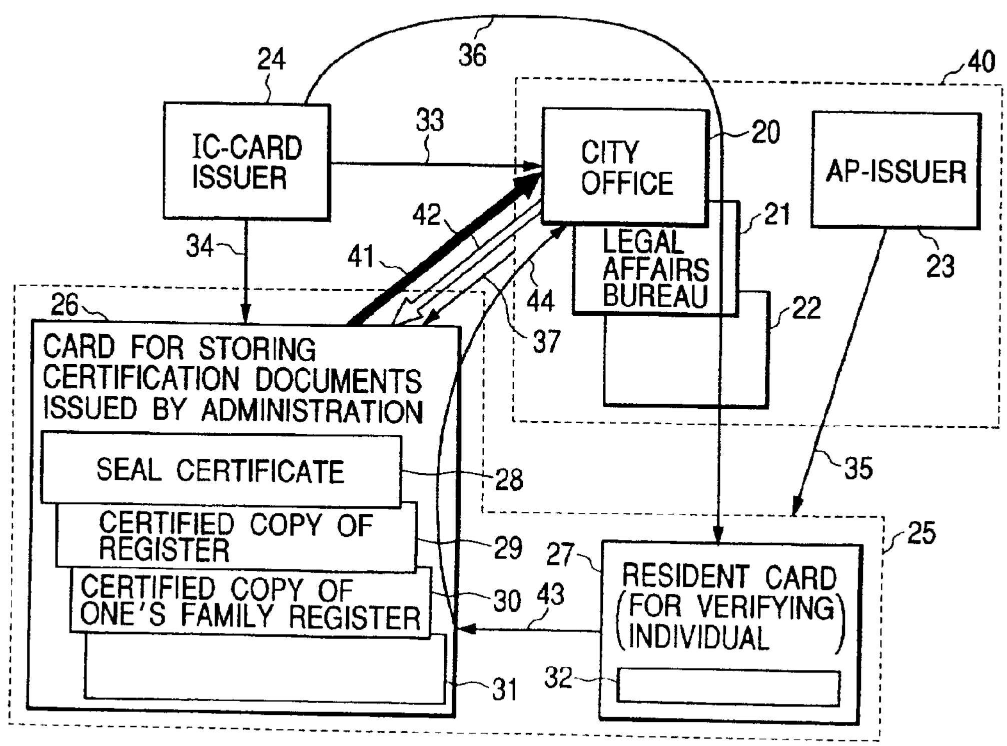
FIG. 19 shows a block diagram showing an example of an administration-entry service.

FIG. 19 shows a block diagram showing an example of an administration entry service. An IC-card issuer 24 issues an IC card 26, a first card, to a user 25. This card can be called a "card for storing certificates and the like issued by administration" in view of its service contents.

First "applications for applying certificates and the like issued by administration" is stored in this IC card 26. In this place, the "first applications for applying certificates and the like issued by administration" means, for example, an "application for applying a seal certificate" 28, an "application for applying a certified copy of register" 29, an "application for applying a certified copy of one's family register" 30, an application for applying the documents issued by the other government offices 31, etc. These applications are issued 39 by respective government offices concerned 40. A city office 20, a legal affairs bureau 21 and other government offices 22 are included in the government offices 40. To be concrete, in place of the government offices, in some case, for example, an organ, that is a group or an enterprise, entrusted by a government office executes the jobs.

On the first card, a card-attribute information of the card and the attribute information of an stored application are stored.

On the other hand, an AP issuer 23 issues a second IC card 27. In place of the AP issuer, etc. 23, to be concrete, for example, an organ entrusted by a government office, that is, a group or an enterprise execute the jobs. In some case, the IC card issuer 24 issues the IC card in place of the AP issuer 23. The second IC card 27 is used for authenticating an individual, for example, it means a resident card.

A user 25 applies the provision of a service (31) which requires the presentation of his seal certificate (28), for example, he applies (41) the registration of his real property to the administration window 40. In this case the first and the second cards, 26 and 27, are made to access the card terminal. In other words, each of these cards is connected to the IC card terminal electrically or electromagnetically. The first card obtains (43) the "attribute information concerning the data for authentication of an individual" owned by the second card, and stores the obtained data in its storage means. And the first card judges a plurality of applications which are able to associate with the functions of the first and the second IC cards. A service organ, to be concrete, the IC card terminal of this organ takes in the list of a plurality of applications which are able to associate with the functions of these first and second IC cards; and confirms the availability of the applications. After the confirmation, the IC card terminal execute a first service and the result is supplied for the sake of the second service. By the execution of these series of services, the user is able to enjoy a target administration service (42). According to the above example, for example, a first administration window issues (28) a seal certificate and it is submitted to a second administration window; and based upon this a second service can be executed. The execution of these series of services are executed based upon a designated program.

Thus, a user is made possible to obtain a desired service by the start of procedures of once by the use of two sheets of IC cards, the procedures which have been done in different windows in a serial order to obtain a first service and a second service. Further, an example of operation of the above-mentioned IC card and IC card terminal will be explained in an embodiment described later.

A third example is that of the wide-area service of a self-governing body. In a case where a resident of a self-governing body A desires a service which requires the utilization of an IC-card application of a self-governing body B, following is an example of a solution for such a case: the resident IC card of the self-governing body A is utilized as an ID card and he will have the self-governing body B issue an IC card and a desired IC-card application. When he wants to utilize an application of the self-governing body B, the resident card issued by the self-governing body A is used as his ID. Technically, the availability of the resident card issued by the self-governing body A will be confirmed.

Figure 20:
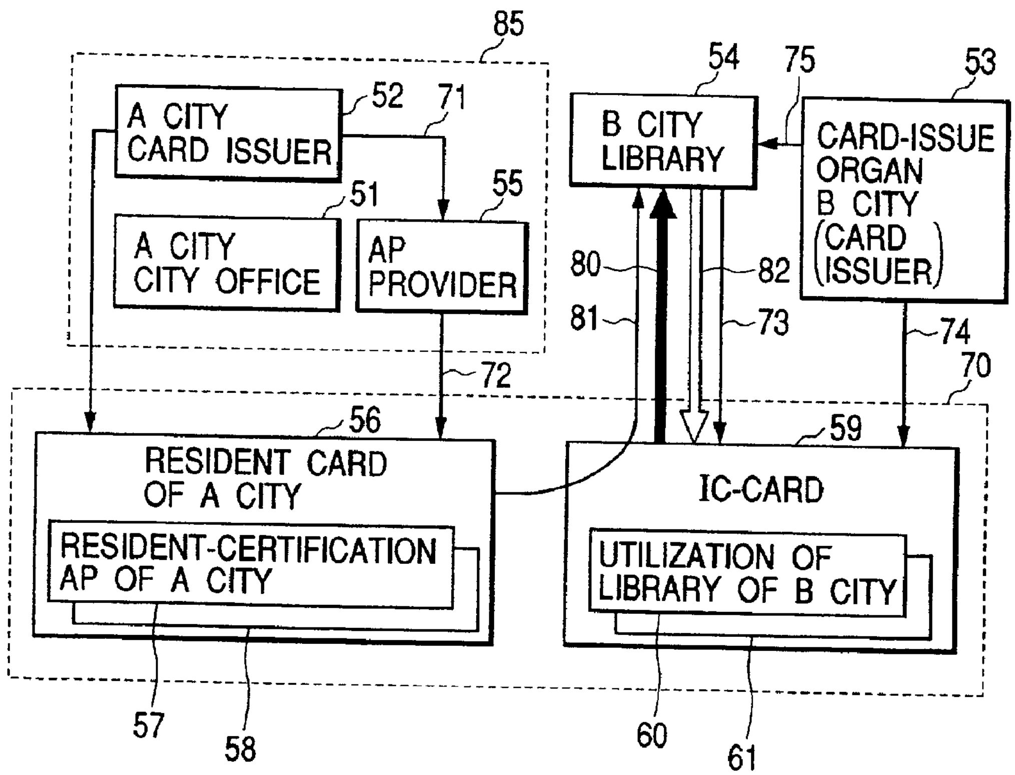
FIG. 20 shows a block diagram showing an example of a wide-range service of a self-governing body.

FIG. 20 shows an example of utilization of a library spreading over two cities as an example of the wide-area service of self-governing bodies. A user 70 is a resident in A City. This is an example in which the user utilizes a library in the neighboring B City.

The user 70 obtains a resident card 56 issued by A City. In this case as in many other cases, the issue of a card is performed by an organ 52 entrusted by A City. Of course, there is a case where a section directly governed by the self-governing body issues cards. And a service provider 55 who provides the services of the city is informed (71) of an "IC-card certificate" which certifies the issue of the IC card 56. The "A city resident card" 56 comprises an application (discrimination number, etc.) 57 which authenticates that the user 70 is a resident of A city. In some cases, it comprises other application 58.

The user 70 is able to obtain the issue (72) of a desired application. In the IC card 56, for example, an application 57 for the resident authentication of A City and other applications 58 are stored. On the other hand, the user 70 receives the issue (74) of an IC card of B City 59 from an organ in charge of the issue of cards. The organ in charge of the issue of cards is properly decided as B City 53 or its entrusted organ 54. The user 70 receives the issue 75 of an application to be used for the utilization of the library from the library 54 of B City. For the issue of the application, as mentioned in the previous examples, there are many kinds of forms such as a case where a designated section of the library itself performs or a case where a different organ entrusted by the library performs.

Further, in the "B city IC card" 59 is included the application 60 which authenticates that the user 70 is able to use a library of B city. In some cases it comprises another application 61.

In this case, "B city IC card" 59 is operated as a first IC card and the "A city resident card" is operated as the second IC card. In the transmission of signals between the card and the terminal, the method of coding the signals is, as described in the previous page, is used as occasion demands.

Thus, a user is able to perform the procedure (80) to check out books (82) in the library in B City 54 by the use the two sheets of cards, a B City IC card 59, a first card, and an A City resident card 56, a second card, at the library 54 of B City. For associated operations of these two cards, the ordinary operations suffices.

<Representative Mode of the Present Invention>

A representative mode of the present invention is a card-service system in which a plurality of IC cards storing applications are made to operate in association, and the above-mentioned IC card comprises the information to designate applications which are able to operate in association among the applications stored in the IC card.

A second mode of the present invention is that the information for designating an application which operates in association being mentioned in the above mode uses at least one out of the following group of information: a card ID of the IC card concerned, a card holder ID, an AID (application identifier), the names of the manufacturer and the issuer of an application, a RID (registered application provider identifier), the names of manufacturer and issuer of a card, and an issuer ID.

Figure 21:
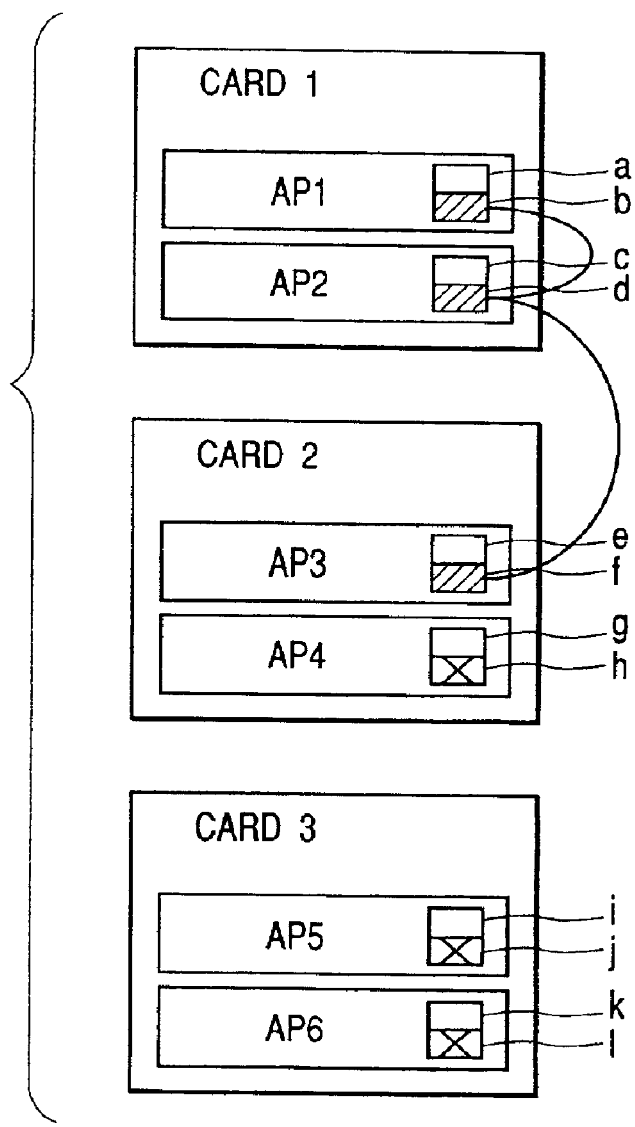
FIG. 21 shows a block diagram showing the associated operation of a plurality of IC cards.

FIG. 21 shows a drawing to be used for the brief explanation explaining the ways of the associated operation by a plurality of applications. In this example 3 sheets of IC cards are shown. In the card 1, an application 1 (hereinafter referred to as AP1) and an application 2 are stored. In the card 2, AP3 and AP4 are stored, and in the card 3 AP5 and AP6 are stored. In each of these applications the information which designates oneself and a company of association with, for example, a discrimination number is stored. In a case, such attribute information is attached to an application, and in another case, it is managed by a system OS. In FIG. 21, the areas a, c, e, g, i and k express the attribute information corresponding to respective applications, and the areas b, d, f, h, j and l showing one-self express attribute information corresponding to respective applications and also the information areas showing companies of association.

In the case of the card 1, AP1 and AP2 are association-possible information for the attribute information of companies, b and d. Further in the case of card 2, a symbol f of AP3 shows association-possible information with AP1 and AP2. AP4 shows that association is impossible. In the case of card 3, AP5 and AP6 both show association-impossible information. Therefore, in the case of these 3 cards, AP1, AP2 and AP3 are association-possible applications. In the present system, it is verified that among these respective applications association is possible or not. There are a plurality of methods of verification such as the case where it is performed in the terminal, in the IC card, etc.

When a card comprises a plurality of services, among these applications, association-possible ones are put together to a list and displayed to be capable of being observed by users.

Next, an embodiment according to the present invention will be explained referring to drawings. The forms of general operations will be explained in this example. This example can be applied to various kinds of applications.

Figure 2:
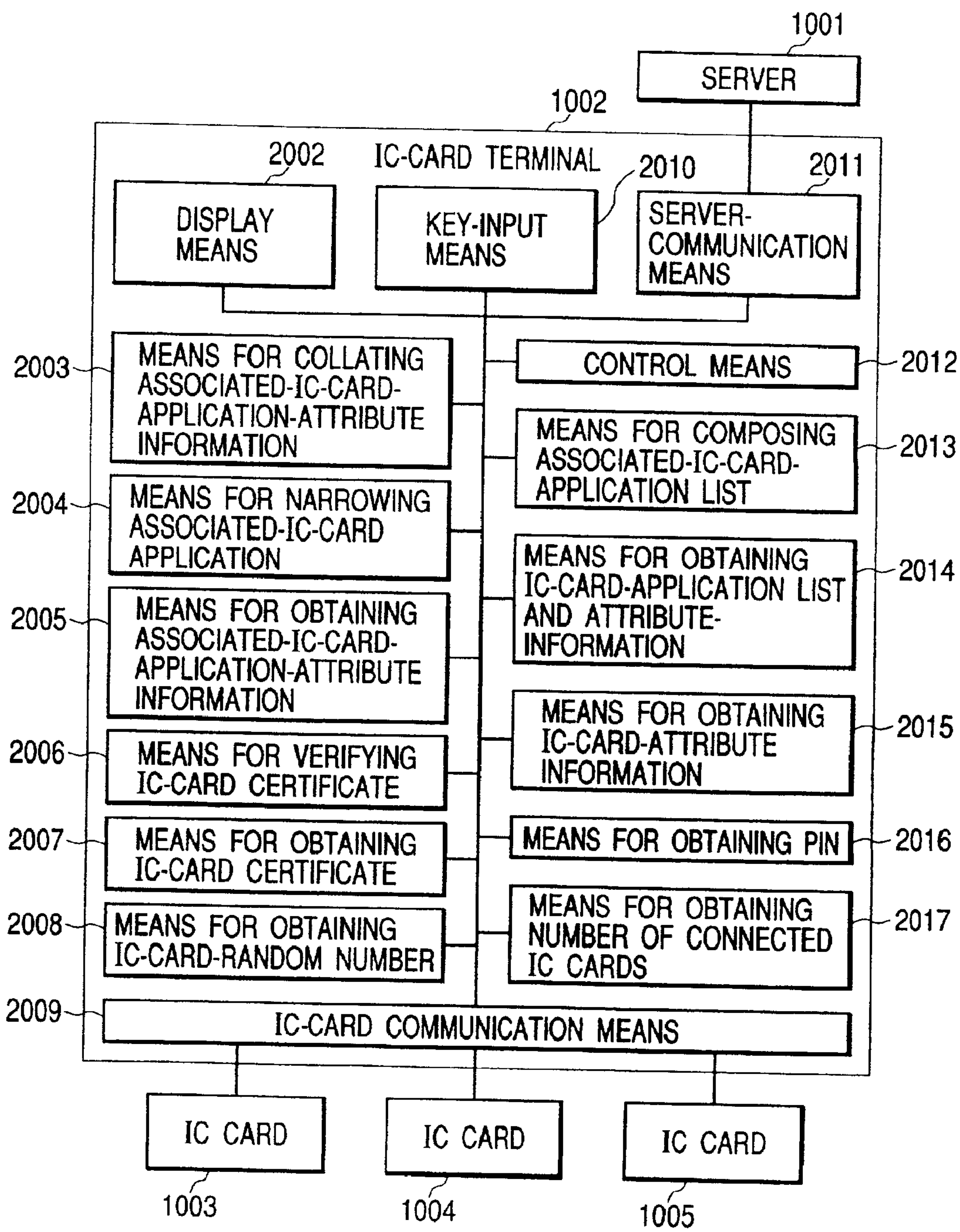
FIG. 2 shows a block diagram showing an example of the configuration of an IC card terminal.
Figure 3:
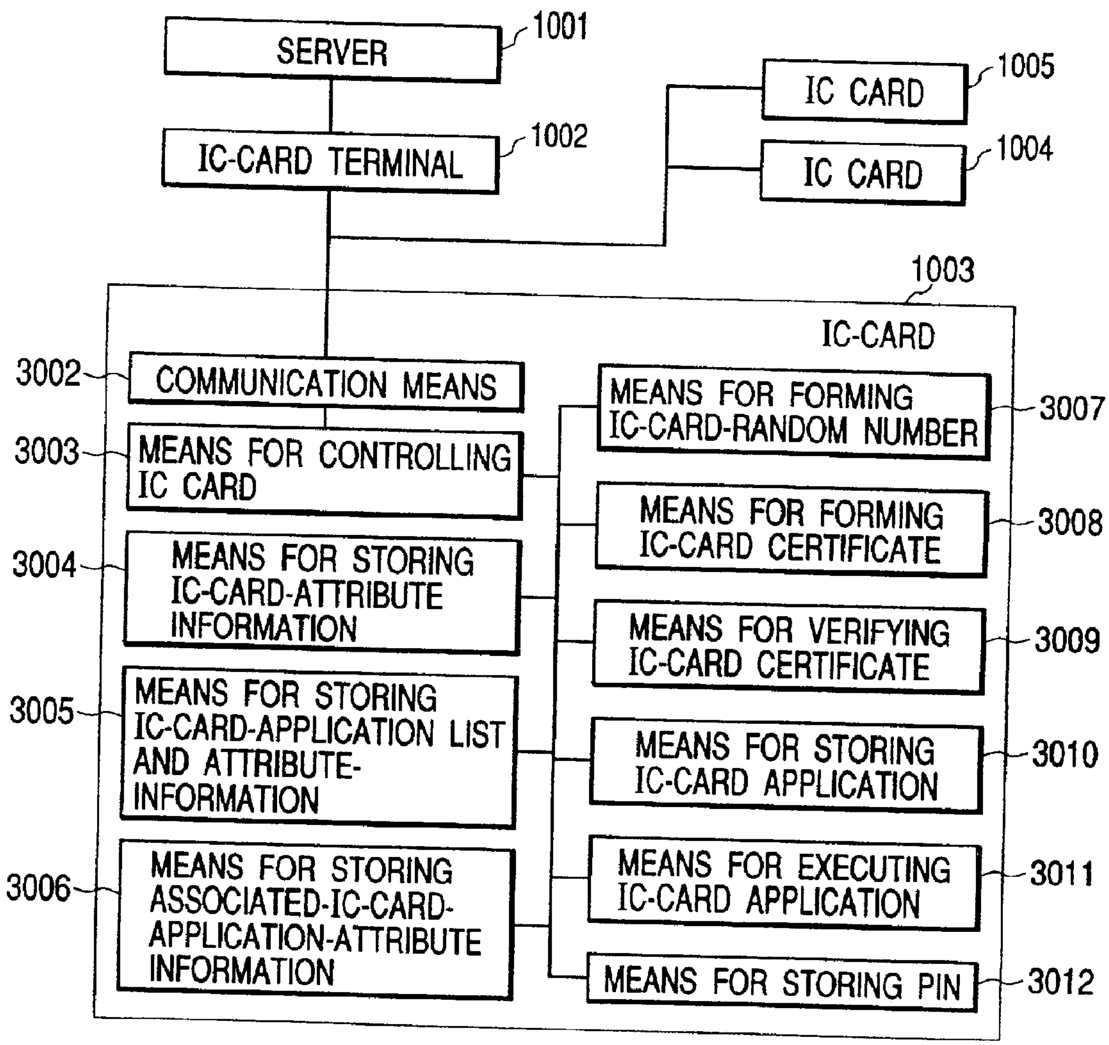
FIG. 3 shows a block diagram showing the configuration of an IC card.
Figure 4:
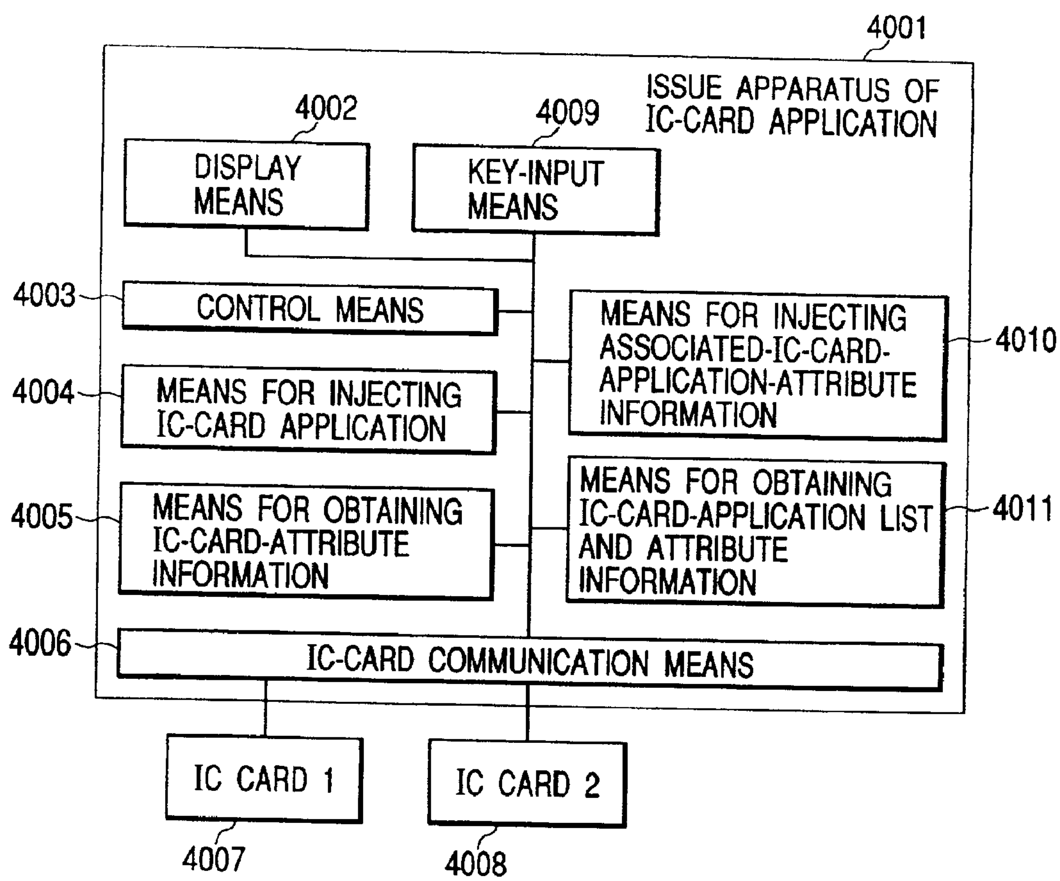
FIG. 4 shows a block diagram showing an example of the configuration of an issue apparatus of an IC-card application according to the present invention.
Figure 5:
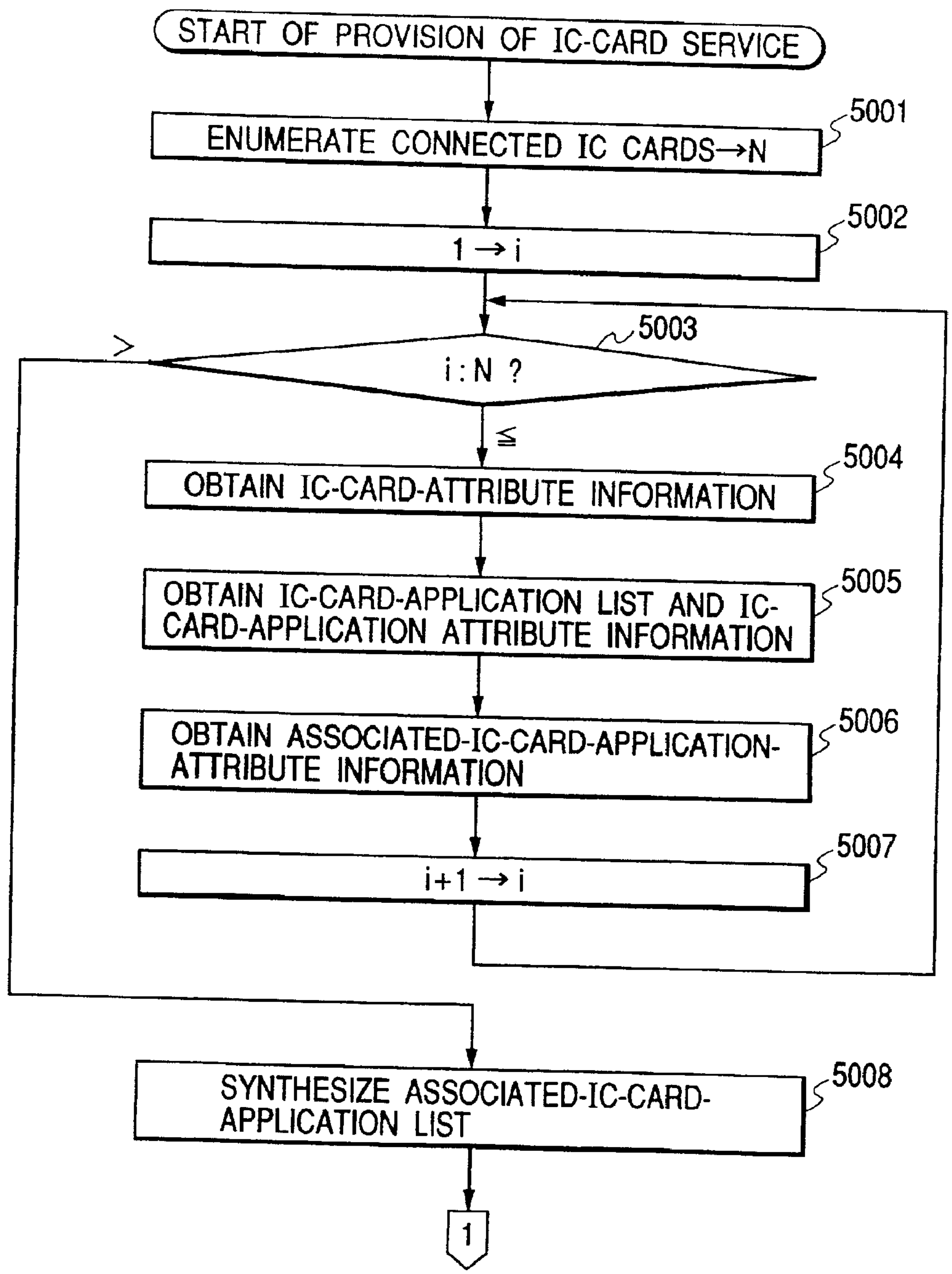
FIG. 5 shows a part of the flow chart for explaining the details of the provision method of IC-card services utilizing an IC card for authentication according to the present invention.
Figure 6:
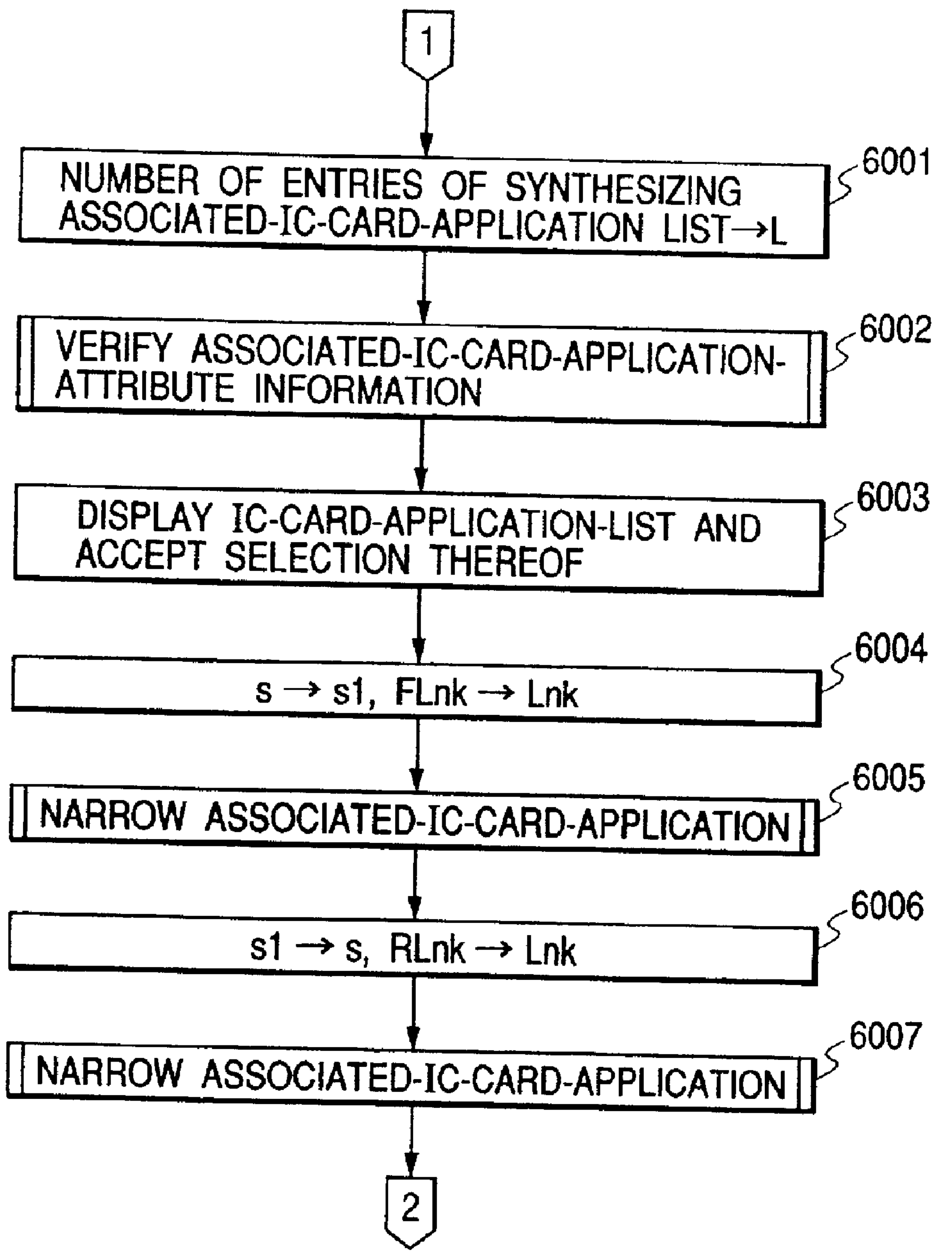
FIG. 6 shows a part of the flow chart for explaining the details of the provision method of IC-card services utilizing an IC card for authentication according to the present invention.
Figure 7:
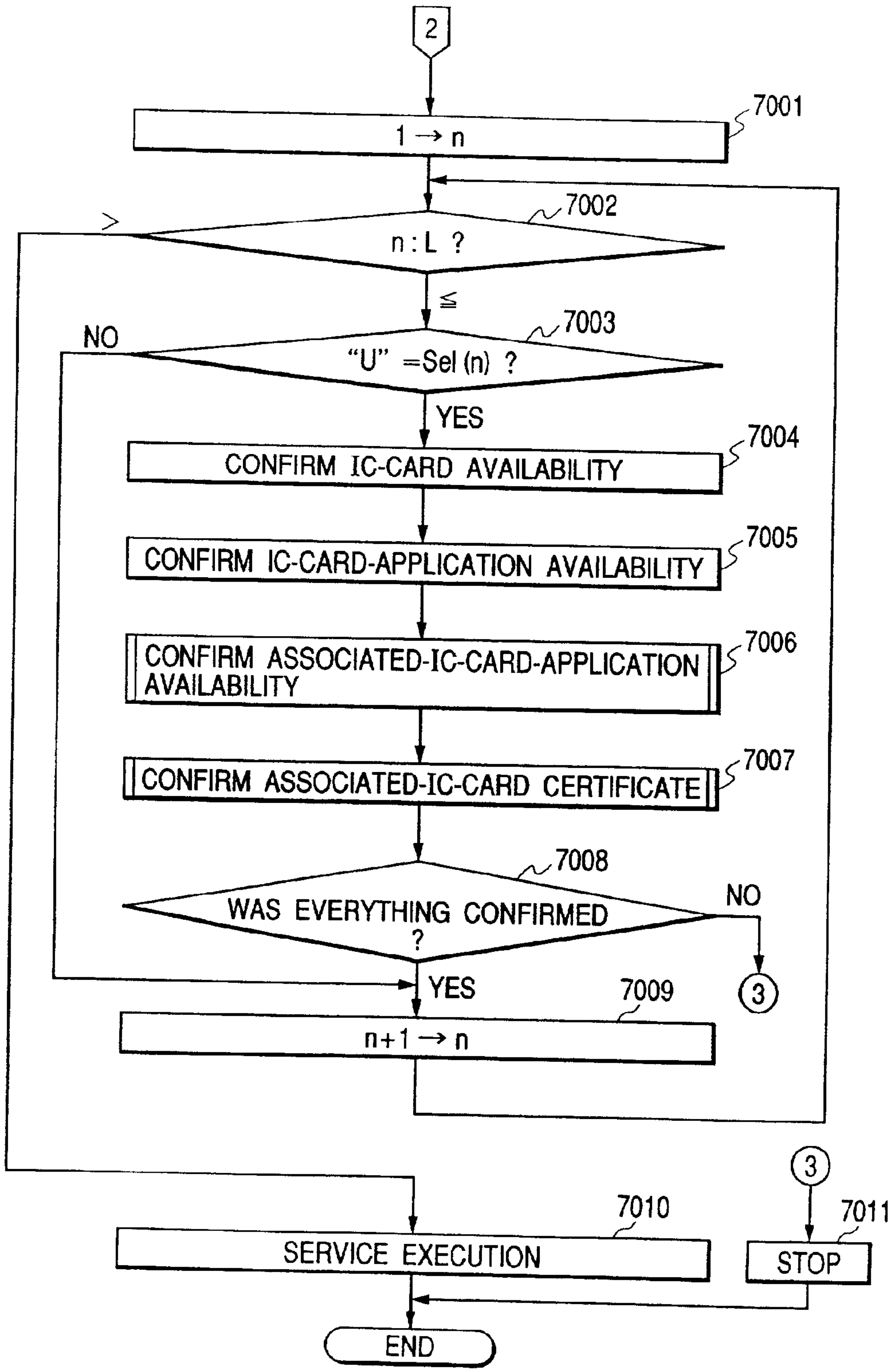
FIG. 7 shows a part of the flow chart for explaining the details of the provision method of IC-card services utilizing an IC card for authentication according to the present invention.

FIG. 1 shows an example of the configuration of an IC card service system in which the method of an IC card service system according to the present invention is operated. FIG. 2 shows the configuration of the principal functions of an IC card terminal. FIG. 3 shows the configuration of the principal functions of an IC card. FIG. 4 shows the configuration of the principal functions of an issue organ of applications. Further, from FIG. 5 to FIG. 7 show representative flows of supplying IC card services according to the present invention.

As shown in FIG. 1, a server 1001 and an IC card terminal 1002 are connected with a network to each other, and the IC card terminal 1002 is connected to a plurality of IC cards, an IC card 1003, an IC card 1004 and an IC card 1005 through terminals or electrically through a connection apparatus. In the IC card terminals, there are so called a contact type and a noncontact type, but the kinds of types have nothing to do with the present invention. In FIG. 1, for simplicity, the connection apparatus is expressed with full lines connecting the IC card terminal 1002 and the IC card 1003, the IC card 1004 and the IC card 1005.

When an IC card holder desires to utilize an IC card service, he will connect the IC card terminal 1002 to the IC card 1003, the IC card 1004 and the IC card 1005. In FIG. 1, 3 sheets of cards are shown, but this is a mere example. In the present invention, the number of IC cards connected to the connection apparatus is not limited, and the number of cards to be connected can be more than 4 or to a piece of connection apparatus IC cards can be connected by turns.

FIG. 2 is a drawing showing the details of an example of the configuration of the IC card terminal 1002 shown in FIG. 1. In other words, the examples of the principal functions of the IC card terminal 1002 are shown in the figure. A control means 2012 controls the operations of respective means in the IC card terminal. The IC card terminal is connected to a server 1001 through a server communication means 2011, and is connected to the IC card 1003, the IC card 1004 and the IC card 1005 through an IC card communication means 2009.

The IC card communication means 2009 is a communication means to transmit signals to the IC card 1003, the IC card 1004, the IC card 1005, etc.

A server communication means 2011 is a means to transmit signals to the server 1001. For these IC card communication means 2009 and server communication means 2011, a communication means for an ordinary IC terminal suffices.

A display means is used to display the contents of services, etc. for users. A key-input means is used for the user to input data and signals concerning the service to an IC terminal by key operation. For the display means and the key-input means those for an ordinary IC terminal suffice. These display means and the key-input means are not necessarily needed when a service can be performed with a very simple operation.

"An obtainment means of the number of IC cards to be connected" is a means which detects the number of IC cards to be connected to the IC card terminal and memorize it. For this means, an ordinary method used in this field which detects the number of IC cards when they are connected to an IC card terminal will do the job.

"A PIN obtaining means" expresses a means to obtain one's PIN. "An IC card attribute information obtaining means” expresses a means to obtain the attribute information of an IC card. “An IC card application list and attribute information obtainment means” expresses a means to obtain a list of IC card applications and attribute information of IC card applications. “An associated IC card application attribute information obtainment means” expresses a means to obtain the attribute information of an application owned by an IC card to be operated in association.

“An associated IC card application list composition means” expresses a means to compose a list of applications owned by an IC card to be operated in association.

“An associated IC card applications narrowing means” expresses a means to narrow the applications in the IC card to be operated in association.

“An associated IC-card application attribute information collation means” expresses a means to collate the attribute information of applications in an IC card to be operated in association.

Other means than the above will be explained as occasion demands in the flow charts of operations described later.

FIG. 3 shows an example of the principal configuration of the IC card 1003 shown in FIG. 1. In the present specification, in view of explanation, the IC card 1004 and the IC card 1005 are explained to have the same configuration as those shown in the IC card 1003. However, it is not necessary that each of these cards have an identical configuration when the present invention is executed. For example, for the IC cards 1004 and the IC card 1005, IC cards of conventional technique will do the job. An IC card control means 3003 controls the operations of respective means in IC cards. “An IC card is connected to the IC card terminal 1002 through a communication means 3002.

“An IC card attribute information storage means” 3004 stores the attribute information of the IC card concerned.

“An IC card application list and an IC card application attribute information storage means” 3005 stores the list of IC-card applications and the attribute of the IC-card applications.

“An associated IC card application attribute information storage means” 3006 stores the attribute information of utilized applications in a case where a plurality of applications are utilized to execute 1 service.

“An IC card applications storage means” 3010 stores applications. A concrete example of the application corresponds to the program of the contents of a service. “A PIN storage means” 3012 expresses a means to store PIN’s.

The above-mentioned storage means are held in a storage element area, for example, in a semiconductor-memory-element area. Therefore, an area which is able to execute the above functions is acceptable, and there is no need to constitute an independent separate means.

“An IC card application execution means” 3011: “a communication means”, “an IC card control means”, etc. can be constituted in same way as those for the use in an ordinary IC card.

The other means than the above will be explained as occasion demands in the explanation of a flow chart described later.

When the IC card 1003 and the IC card 1004 are connected to the IC card terminal 1002, a control means 2012 detects it, and a provision method of an IC-card service as opposed to the utilization of an IC card for authentication according to the present invention starts to operate.

FIG. 5 shows a part of a flow chart for explaining the details of an example of an IC card service providing method utilizing an IC card for authentication according to the present invention.

In the following explanation will be given referring to the flow chart.

An example of a series of processes of providing a desired service is shown in FIGS. 5 to 7. In other words, it is made possible to make a plurality of applications operate in association based upon various kinds of information owned by an IC card which is accessed by the IC card terminal. The processes shown in FIG. 5 are those of composing a list of applications of IC cards which have the probability of associated operation (1). The processes shown in FIG. 6 are those of deciding the combination of IC-card applications which executes in association (11). The processes shown in FIG. 7 are those of confirming the availability of (111) an IC card and IC-card applications, and those of certifying the connections of them.

<<(1) An Example of Composing a List of IC-Card Applications to be Operated in Association>>

<Step 5001 : “Enumerating Connected IC Cards”>

By means of a means 2017 for enumerating IC cards connected to an IC card terminal 2001, the number of IC cards connected to the IC card terminal 2001 is obtained and a variable N is set.

<Respective Steps From Step 5002 to Step 5007>

These steps constitute a loop, and executes the process of every connected card expressed by an variable i. When i is 1, it expresses the IC card 1003, when i is 2, it expresses the IC card 1004 and when i is 3, it expresses the IC card 1005. The process of each of these cards is performed by the loop, and in FIG. 1 three IC cards are shown; however, as mentioned in the previous page, the number of IC cards is not limited to 3 in the present invention. In step 5007, 1 is added to i, the process goes round the loop N times until it is terminated by a loop-termination-judgment step 5004.

<Step 5004: “Obtaining an IC-Card-Attribute Information of an IC Card Terminal”>

An IC card terminal obtains the attribute information of an IC card which is expressed by a variable i by means of an IC-card-attribute-information-obtainment means 2015 (refer to FIG. 2). An IC-card-attribute information expresses, for example, ID of an IC card, an IC-card-public key, the name or ID of a card holder, the name or ID of an IC card issuer, the name or ID of an IC card manufacturer, etc. These various kinds of IC-card-attribute information can be read out from an IC-card-attribute-information-storage means 3004.

<Step 5005: “Obtaining an IC-Card-Application List and the IC-Card-Application-Attribute Information”>

An IC card terminal obtains an IC-card-application list and the attribute information of IC-card applications of IC cards shown with a variable i by means of the “IC-card-application list and the attribute-information-attainment means” 2014. The above-mentioned attribute information of an IC-card application is, as shown in FIG. 3, stored in the “IC card application list and the attribute information of an IC card applications storage means” 3005. Therefore, it is possible to obtain the IC-card-application list and the attribute information of an IC card applications from the attribute-information-storage means 3005 owned by an IC card. The above-mentioned attribute information of an IC-card applications means the following: a public key of an IC card application, the name or AID (application identifier) of an IC card application, the name or ID of the manufacturer of an IC card application, the name or RID (registered application provider identifier) of an IC-card-application issuer, etc. The attribute information of an IC-card application uses a designated number of pieces of the attribute information in correspondence to the contents of a service.

<Step 5006: “Obtaining Associated-IC-Card-Application-Attribute Information”>

An IC-card terminal obtains the attribute information of IC card applications to be operated in association stored in the “associated IC card applications attribute information storage means” 3006 of an IC card shown by a variable i by means of an “IC card application attribute information obtainment means” 2005 to be operated in association.

Figures 15, 16:
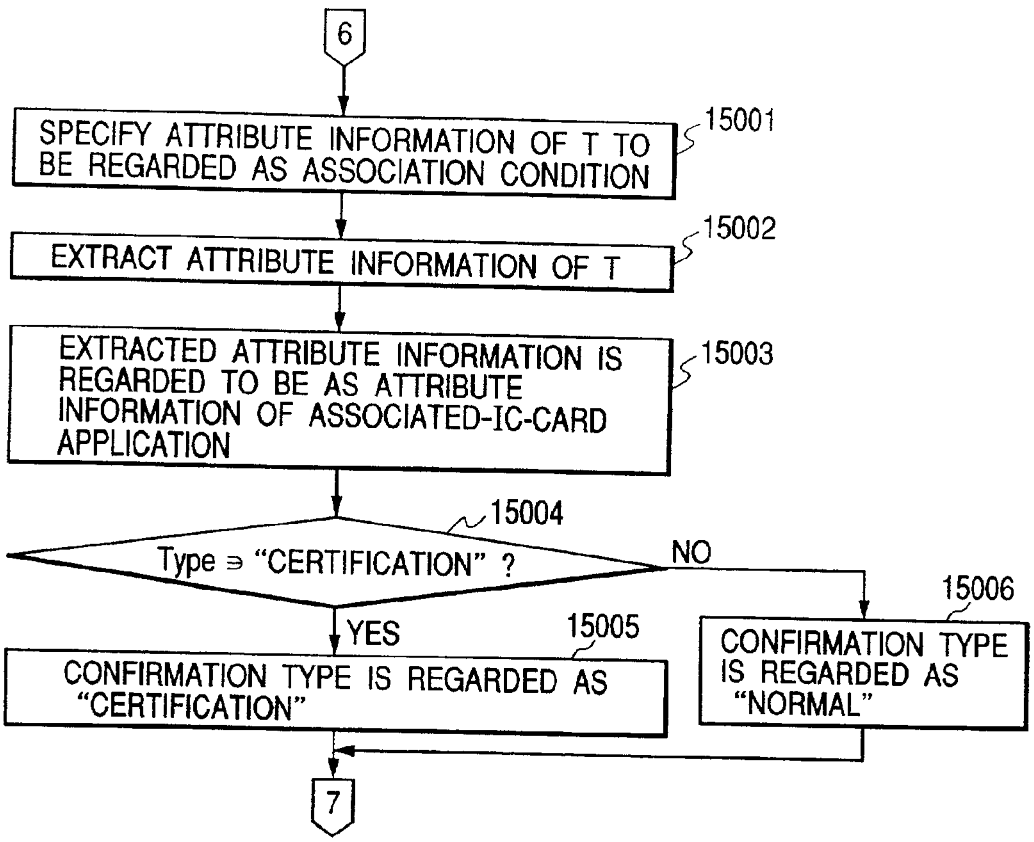
FIG. 15 shows a part of the flow chart of an example of an IC-card-application-issue method according to the present invention.
FIG. 16 is a drawing showing an example of a description form of an associated-IC-card-application-attribute information.

The “associated IC card application attribute information” is the description described on conditions for designating IC card applications of an IC card which is needed to operate simultaneously being on the requested side for association, a confirmation method that the application is operating, and such, in every IC-card application on the request side for association as described in the previous pages. An example of such a description is shown in FIG. 16.

A symbol #16001 shows consecutive numbers given to “the associated IC card applications attribute information” stored in the “associated IC card application attribute information storage means” 3006 owned by an IC card.

“IC card application name” 16002 shows the name of an IC-card application on the request side for association.

“Associated IC card application attribute information” 16003 is the description which describes the attribute information of an IC card on the requested side for association in a form to be able to collate with the IC-card-application list, the attribute information of an IC-card applications stored in the attribute-information-storage means 3005, or IC-card-attribute information stored in the IC-card-attribute-information-storage means 3004. The “associated IC card application attribute information” is expressed by numerical data or character-string data; however, to be concrete, the kind of expression method to be taken is decided by an IC-card issuer. For the expression form, any form well known to the public is applied. For example, TLV (tag length value) form, SGML form, HTML form, XML form, IDL form (LORBA form), etc. can be cited, or it is also possible to decide the form with binary data.

The “confirmation type” 16004 describes the designation of a confirmation method concerning the IC card or IC-card application having the contents described in the “associated IC card application attribute information” 16003 when a plurality of IC-card applications operate in association with each other.

In the present embodiment, in the column of “confirmation type” 16004, one out of “certification”, “availability” or “normal” is described. In the case of “certification”, it expresses that the certificate showing that an IC card is connected is needed to be verified by the IC cards concerned. In the case of “availability”, only confirmation of availability suffices, and it expresses that there is no need that an IC card and IC-card application are connected. In the case of “normal”, an IC card terminal confirms that an IC card and an IC-card application are connected, and it expresses that it is needed to confirm the availability of respective ones.

<Step 5008: Synthesizing Associated-IC-Card-Application List>

The IC-card terminal, after it has read out necessary information from respective IC cards, it brings together the IC-card attribute information, the attribute information of IC-card application, the attribute information of associated-IC-card application, etc. obtained from respective IC cards, to an associated IC-card-application list. To be concrete, for the associated-IC-card-application-list-composition means, the one which is known as a sort merge suffices. The form is shown in FIG. 17.

A symbol #17001 is the consecutive number given to IC-card applications stored in “the associated IC card application list”.

A symbol 17002, “the name of an IC card application”, means the name of an IC-card application on the request side for association.

A symbol 17004, “IC card application attribute information”, means the attribute information of IC-card applications on the request side for association. These kinds of information set the contents obtained at “IC card application list and attribute information obtainment step” 5005.

Further the “IC-card attribute” obtained at “IC card attribute information obtainment step” 5004 in an IC-card terminal is added to the IC-card-application-attribute information 17004 on every IC-card application.

The “associated IC card application attribute information” 17005 and the “confirmation type” 17006 set the “associated IC card application attribute information” 16003 and the confirmation type 16004 obtained at “associated IC card application attribute information obtainment step” 5006 so as to make the IC-card-application name 16001 and the IC-card-application name 17002 coincide with each other.

“IC card connection number” #17003 controls the loop for obtaining information from respective IC cards and sets the value of a variable i which designates an IC card on every IC-card application.

Owing to the associated IC-card-application list, the configuration of IC-cards connected to the IC-card terminal 1002 and the IC-card application in every IC card can be reviewed. About the other columns shown in FIG. 17 will be explained later as occasion demands. The symbols in parentheses of respective columns show abbreviations to be used for referring respective columns in the explanation of flow charts.

<<(11) An Example of Deciding the Combination of IC-Card Applications which Operate in Association with each other>>

The steps from “step of setting the number of entries in the associated IC card application list” 6001 to “step of narrowing the associated IC-card applications” r following to “associated IC card application list composition step” 5008 are shown in FIG. 6. These steps are naturally executed inside an IC-card terminal. In the following processes, the reliance among respective IC-card applications is analyzed following the conditions shown by associated IC card application attribute information” stored in the “associated IC card application list”, and the probability of execution of an IC-card application is judged. In the following, the details of each step will be explained.

<Step 6001: Setting the Number of Entries of Synthesizing Associated-IC-Card-Application List>The number of entries of the associated IC-card-application list shown in FIG. 17, that is, the number of stored IC-card applications is set in a variable L.

<Step 6002: Verifying Associated-IC-Card-Application Attribute Information>

An IC-card terminal analyses the reliance among the IC-card applications performing the collation between the attribute information of the associated-IC-card application 17005 and the attribute information of the IC-card application 17004 by means of the “associated IC card application attribute information collation means” 2003.

Figure 8:
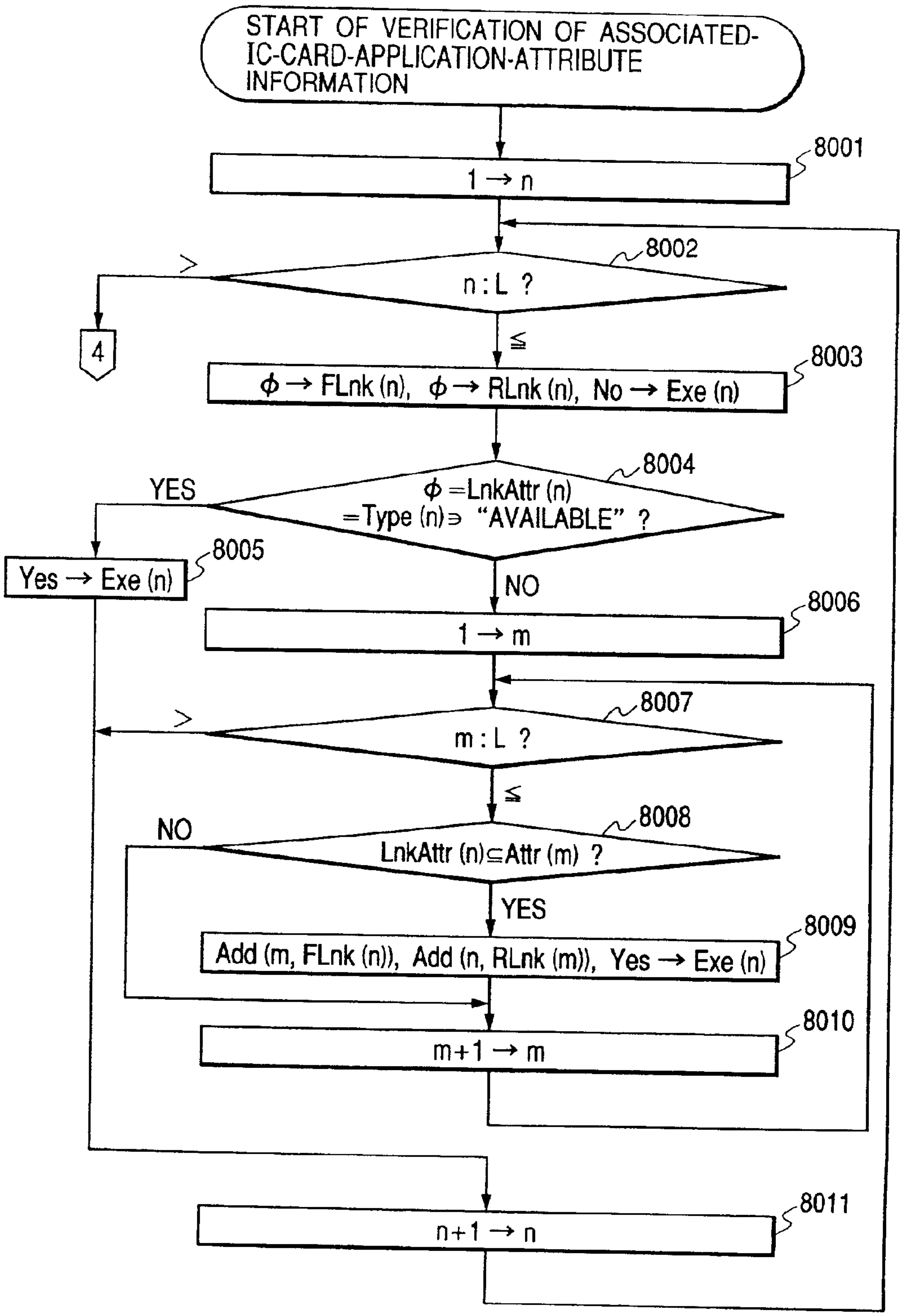
FIG. 8 shows a part of the flow chart for explaining an "associated-IC-card-application-attribute-information-collation method" according to the present invention.
Figure 9:
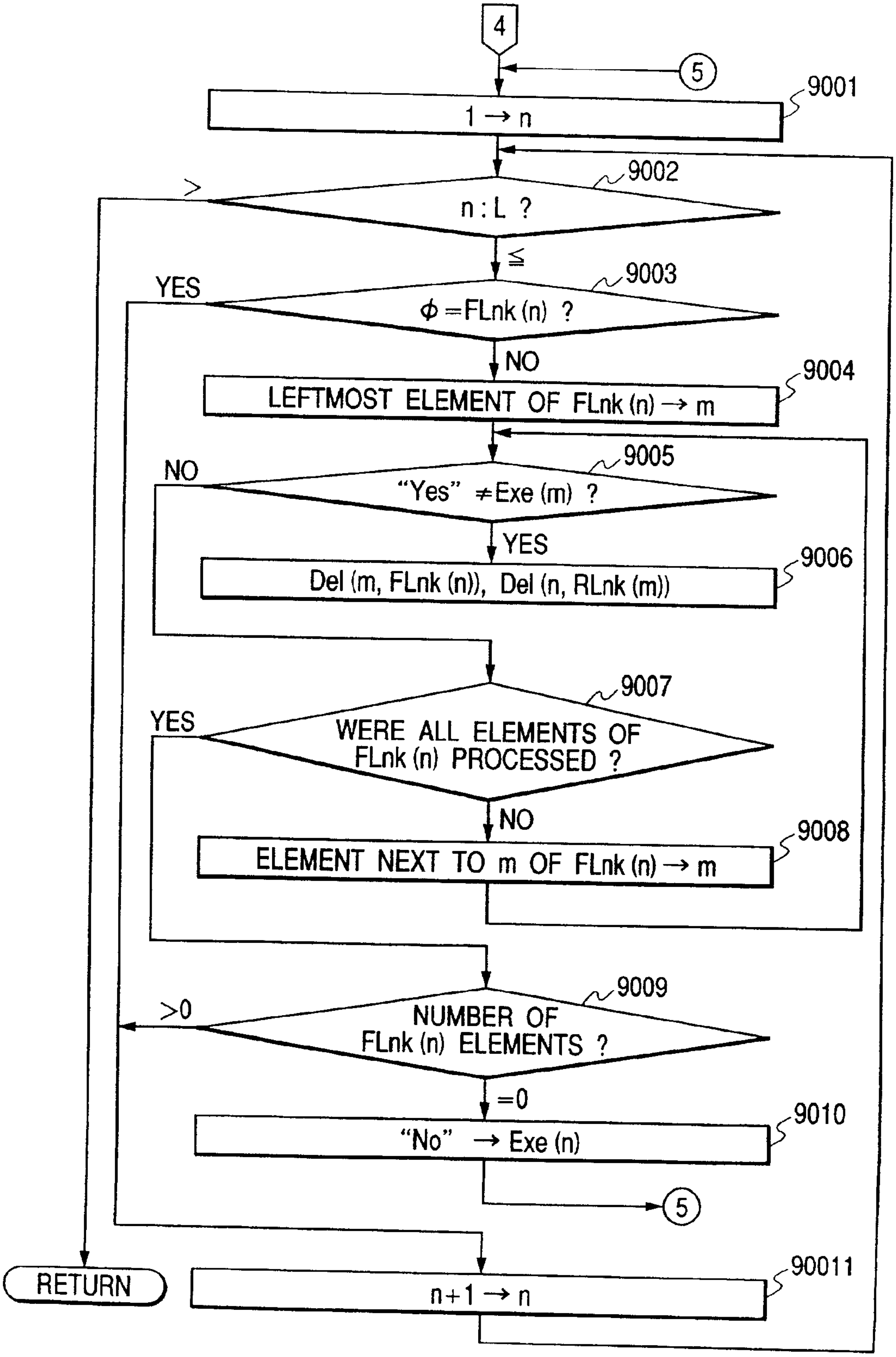
FIG. 9 shows a part of the flow chart for explaining an "associated-IC-card-application-attribute-information-collation method according to the present invention.

The details of concrete examples of the “associated ID card application attribute information collation step” will be shown in FIGS. 8 and 9.

The flow chart shown in FIG. 8 forms a double loop of a variable n and a variable m, and about IC-card applications stored in the associated-IC-card-application list, every piece of information in the attribute information of the associated IC-card application 17005 and every piece of information in the attribute information of the IC-card application 17004 are collated with each other, and an IC-card application # 17001 is set, the application which has conformable conditions to a "forward association link" 17007 and a "reverse association link" 17008.

The "IC card application attribute information" 17004 means the information of oneself, and the "IC card application attribute information" means that of his company. The "forward association link" or the "reverse association link" is the information showing the order in the list of applications for association. For example, it is assumed that the #2 column of the "forward association link" denotes information "1" and the #1 column of the "reverse association link" denotes information "2". This shows that the application which is able to associate with #2 is able to associate with the application of an IC card of #1.

The "forward association link" or "reverse association link" expresses the state as described in the following.

The forward association link 17007 and the reverse association link 17008 express links of both directions. When the collation is successfully finished and an associated operation is possible, and when the attribute information of an associated-IC-card application 17005 is vacant and the attribute information of associated-IC-card applications 17004 alone is able to execute, "Yes" is set in an executable flag 17009, and in a case where the execution is not possible, "No" is set.

<Steps 8001 to 8003>

At step 8001, the loop variable n is set for 1. The symbol n is an index indicating the name of an IC-card application #17001. By means of loop-end-judgment step 8002, this process is repeated L times (looped).

At step 8003, ϕ (vacant) is set in FLnk (n) that is the forward association link of n 17007 and RLnk (n) that is the reverse association link of n 17008, and "No" is set in Exe (n) that is the executable flag of n 17009. When the value of the executable flag of n 17009 is "Yes", it expresses that an IC card or an IC-card application shown in the "associated IC card application attribute information" 17005 is connected to the IC card terminal 1002 or the "associated IC card attribute information" 17005 is vacant and the "IC card application attribute information" 17004 is able to execute independently. When the value is "No", since a necessary IC card or an IC-card application is not connected to the IC-card terminal 1002, it is impossible to execute the I-C card application.

<Step 8004: Judgment Step>

In this step, "ϕ=LnkAttr(n)", that is, the attribute information of an associated-IC-card application of n 17005 is vacant. In other words, the other applications are not needed or in a case where "Type (n) ∋ available", that is, where the confirmation type 17008 of n is available, in step 8005 Exe(n), that is, an executable flag of n 17009 is set as "Yes". At step 8011, 1 is added to n and step returns to a loop-termination-judgment step 8002.

In a case where the condition of judgment step 8004 does not hold good, the loop variable m is set as 1 at step 8006. The character m is, similar to n, an index indicating # 17001. At loop-termination-judgment step 8007, when m does not exceed L, at the next judgment step "LnkAttr(n) ⊆ Attr(m) ", that is, it is judged that the associated-IC-card-application-attribute information 17005, which is the association target of an IC-card application shown by n is included in the attribute information of IC-card application 17004 of an IC-card application shown by m or not. In a case, where it is included, at step 8009, "Add(m,FLnk(n)" that is, m is added to the forward association link of n 17007, and n is added to "Add(n,RLnk(m), that is, the reverse association link 17008. And the Exe, that is, Yes is set in the executable flag 17009 of n. In the next step 8010, 1 is added to m and return to the loop-termination-judgment step 8007.

FIG. 8 shows the state in which an IC-card application satisfying a condition is not found after setting many stages of links, since the links are set toward the front one after another.

The flow chart shown in FIG. 9 shows a process to cancel a link as a measure for such a case.

At step 9001 a variable n for controlling the loop is set as 1, and at loop-termination-judgment step 9002 until n exceeds L, that is, the processes shown in the following are executed in each of the entries in associated IC-card application list. At judgment step 9003 "ϕ=FLnk(n)", that is, when the forward association link 17007 of n is vacant, at step 9011 1 is added to n and the process returns to the loop-termination-judgment step 9002. If it is not vacant, in steps, from 9004 till 9008 FLnk(n), that is, process if performed in every element in the forward association link 17007. Assuming that at step 9004, the leftmost element in the forward association link 17007 of n is m, and at judgment step 9005 "Yes≠Exe(m)", that is, when the executable flag 17009 of m is not Yes, at step 9006, "Del(n,RLnk (m))", that is, m is eliminated from the forward association link 17007, and "Del(n,RRLnk(m)), that is, m is eliminated from the reverse association link of m. At the judgment step 9005 when the executable flag 17009 of m is Yes, the process skips over step 9008 and proceeds to the loop-termination-judgment step 9007, and investigate whether all elements in the forward-association link 17007 of n are processed or not. When there are some left undone, at step 9008, the element next m is made a new m. At this time, in a case where m has been eliminated, the following elements are set regarding that m is not eliminated. And it returns to judgment step 9005.

At loop-termination-judgment step 9007, in a case where all elements in forward association link 17007 of n have been processed, process proceeds to judgment step 9009 and investigates the number of elements in forward association link 17007. In a case where it is zero, it shows that IC-card application of n has become not executable, so that at step 9010, No is set in the executable flag 17009. In this case, an elimination work of links has to be done over again from the beginning, process returns to step 9001.

At judgment step 9002, when the number of elements is not zero, 1 is added to loop-control-variable n and process returns to loop-termination-judgment step 9002.

At loop-termination-judgment step 9002, if n has exceeded L, process will be terminated and the attribute verifying step of associated IC-card application 6002 is completed and process proceeds to step 6003 for displaying IC-card-application-list and accepting selection thereof.

At step 6003 for displaying IC-card-application-list and accepting selection thereof, IC-card-application name 17002, in which an executable flag in associated IC-card-application list is Yes, is displayed in a display means 2002 as one among several selectable items, and accepts the selection by users through a key-input means 2010. When a user selects an item, an index in an associated-IC-card-application list showing the IC-card application corresponding to the selected item is set in a variable s and process returns to step 6002. It is possible to add an IC-card-connection #17003 or an IC-card-attribute information obtained by means of an IC-card-attribute-obtainment means 2015 to a selected item for the discrimination of an IC card.

At the next step 6004 s is set as s1. It is done for savinging the value of s. The FLnk, that is, the forward association link 17007 is set in Lnk. It is done for referring the forward association link 17007 as the name of Lnk in the next associated-IC-card-application-narrowing step 6005.

Figure 10:
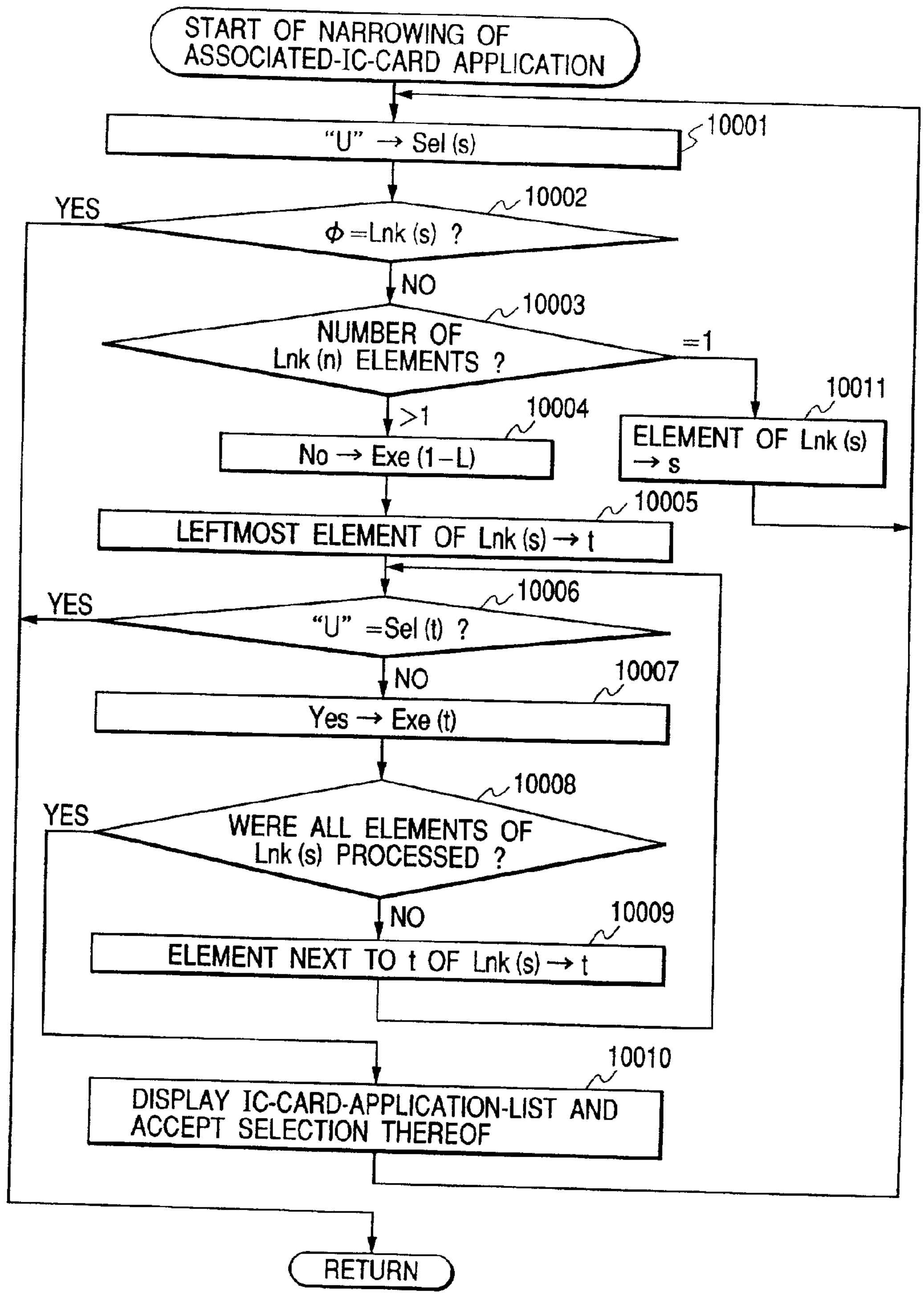
FIG. 10 shows a part of the flow chart for explaining an "associated-IC-card-application-narrowing method" according to the present invention.

FIG. 10 shows a flow chart for narrowing associated applications.

In the associated-IC-card-application-narrowing step 6005, IC-card applications to be executed are narrowed showing users executable IC card applications as optional items according to the reliance based on the attribute information stored in the storage means of associated-IC-card-application-attribute information by means of the associated-IC-card-application-narrowing means 2004. FIG. 10 shows the details of a series of process.

At step 10001, "U" is set in user's selectable flag 17010 of s. The Lnk of s, that is, when the elements of the forward association link 17007 is vacant at present, process is terminated and returned. If it is not vacant, the number of elements is investigated at judgment step 10003, and if the number of elements is 1, the element is set in s, that is, process returns to step 10001 automatically regarding that it is selected by a user.

At judgment step 10003, when the number of elements exceeds 1, in steps, from 10006 to 10009, the existence of Yes in the executable flag 17009 is investigated about every element, and an executable flag 17009 is set on the IC card application which is considered to be a selectable item. In other words, after No is set in the executable flag 17009 of all IC-card applications at step 10004, at step 10005, the leftmost element in Lnk of s is put t and at step 10006, it is investigated if the user-selection flag 17010 is "U" at judgment step 10006. In the case of "U" process is terminated and returned. If it is not, Yes is set in the executable flag of t 17009. At judgment step 10008, it is investigated if all elements in Lnk of s have been processed, and if there is any left undone, the element next t is newly set as t and process returns to the judgment step 10006.

At judgment step 10008, when all elements have been finished, IC-card-application name 17002 is displayed on the display means 2002 as selectable items and the selection by users can be accepted, the IC-card-application name 17002 of which the executable flag 17009 in the list of the associated IC card application is found to be Yes at IC-card-application-list display and accept step 10010. When an user selects an item, the index of an associated-IC-card-application list which shows the IC-card application corresponding to the selected item is set in the variable s and returns to step 10001. This step is identical to the IC-card-application-list display and selection reception step 6003, explained in the previous page.

Next, let us move to the flow chart shown in FIG. 7.

When the process at an associated-IC-card-application-narrowing step 6005 is finished, at the next step 6006, the value of s which has receded once to s1 in the past is recovered to the original value s and also RLnk, that is, the reverse association link 17008 is set in Lnk. Because of the fact that, at the next associated-IC-card-application-narrowing step 6005, the reverse association link 17008 is referred to as the name of Lnk. The process in the next associated-IC-card-application-narrowing step 6007 is identical to that in the associated-IC-card-application-narrowing step 6005 shown in FIG. 10. Only one different point is that the contents referred by Lnk are those of the reverse association link 17008.

The combination among IC-card applications which operate in association is decided by the process mentioned in the above.

<<(111) An Example of Availability Confirmation and Connection Certification of an IC Card and an IC-Card Application>>

Next, in steps, from 7001 to 7009, the availability confirmation and connection certification of respective IC cards and IC-card applications are performed.

At step 7001, a loop control variable n is set as 1. The character n is an index indicating #17001. At loop-termination-judgment step 7002, it is judged if every IC-card application has been processed. In a case where n is less than L, at judgment step 7003, when user-selection flag 17010 of n is not "U", the succeeding steps are skipped and process proceeds to step 7009, and if it is "U" at IC-card-availability-confirmation step 7004, the availability of an IC card shown by IC-card connection #17003 of n is confirmed and at an associated-IC-card-application-availability-confirmation step 7005, the availability of an IC-card application or of an IC card is confirmed. When the availability has been confirmed, the result is regarded as "confirmation OK" and if not they are expired.

Figure 11:
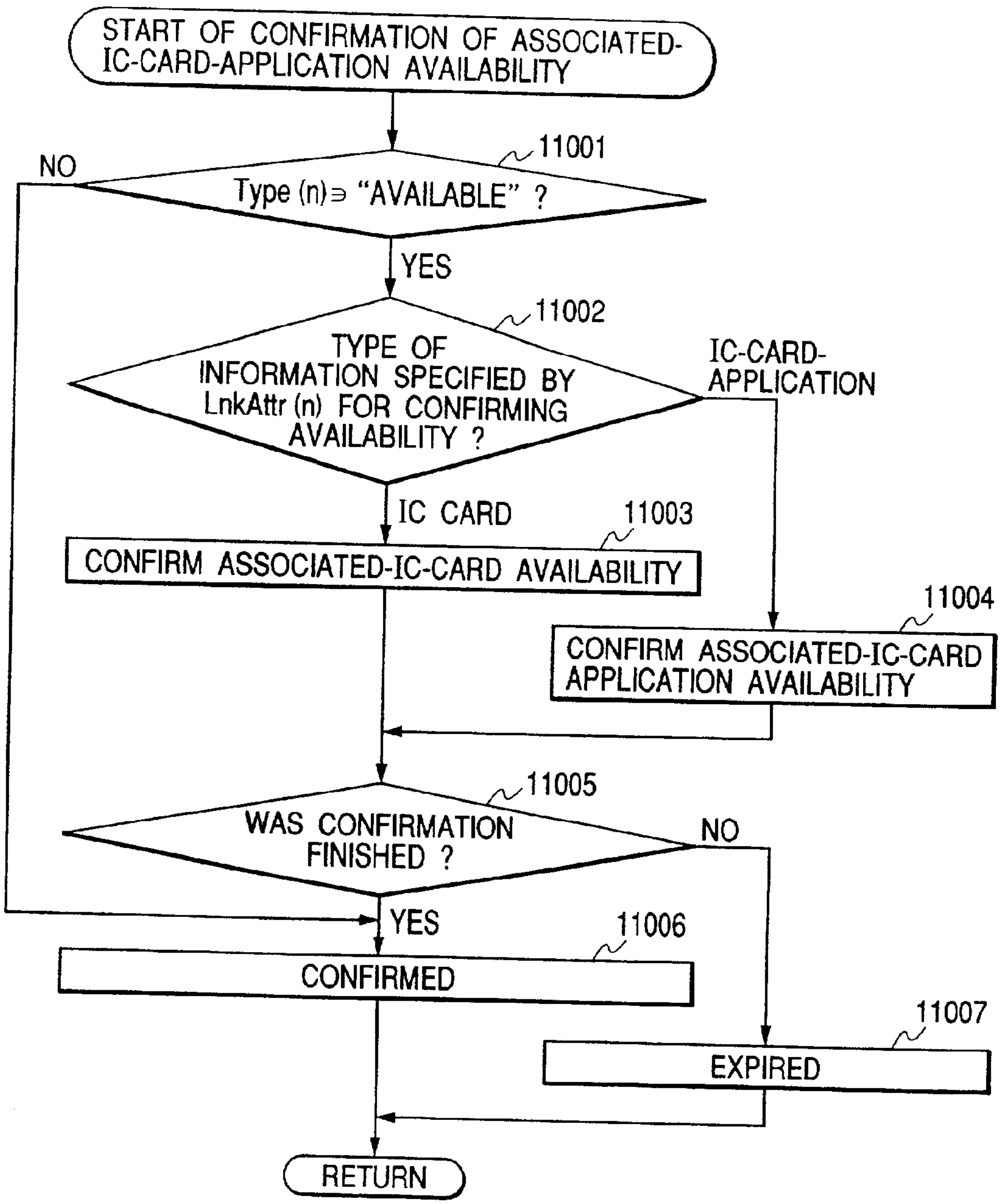
FIG. 11 show a flow chart for explaining an "associated-IC-application-availability-confirmation method" according to the present invention.

At the next associated-IC-card-application-availability-confirmation step 7006, the availability of IC card or IC-card application shown by the associated-IC-card-application-attribute information of n 17005 is confirmed. The details of the above are shown in FIG. 11.

At judgment step 11001, investigation is made whether the confirmation type of n 17006 is effective or not. If it is not, the availability confirmation is scheduled to be performed at IC-card-application-availability-confirmation step 7005, so that at confirmation-result-set step 11006, here in this place, process will be regarded as "confirmation OK".

At judgment step 11001, when the confirmation type of n 17006 is effective at the next judgment step 11002, investigation is made whether the contents of the associated-IC-card-application-attribute information of n 17005 show an IC card or an IC-card application. When the contents show the IC card, at IC-card-availability-confirmation step 11003, the availability of the IC card shown by the contents of an associated-IC-card-application-attribute information 17005 is confirmed. In a case of an IC-card application, at IC-card-application-availability-confirmation step 11004, the availability of an IC-card application shown by the contents of an associated-IC-card-application-attribute information 17005 is confirmed. The contents of the associated-IC-card-application-attribute information 17005 can be described utilizing a conventional technique such as TLV (tag length value), format etc., therefore, the judgment at judgment step 11002 can be executed with conventional technique.

When the availability is confirmed, through the next judgment step 11005, at confirmation-result-set step 11006, the result is regarded as "confirmation OK", and if confirmation is not possible, the result is expired at confirmation-result-set step. and the control is returned.

Figure 12:
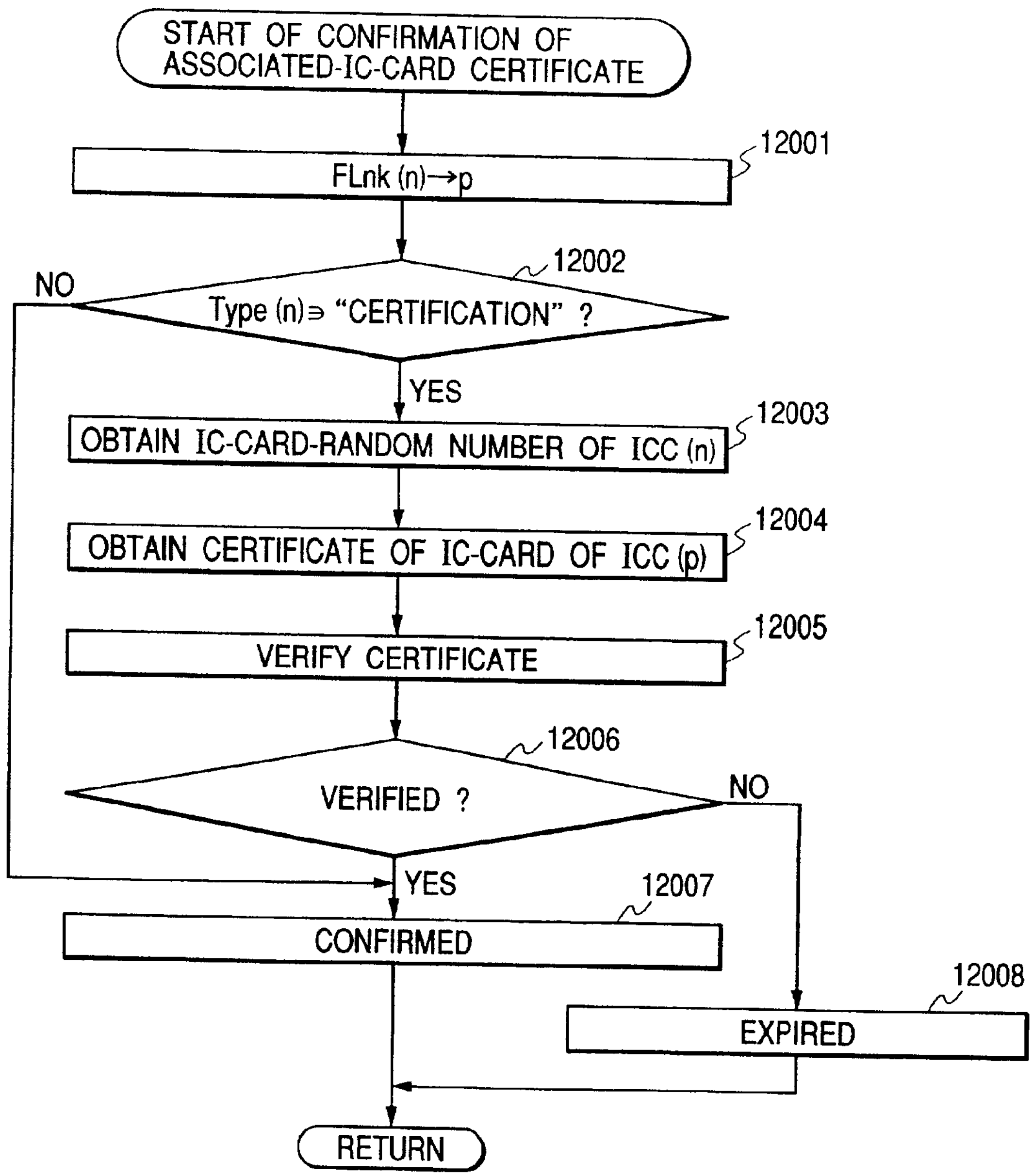
FIG. 12 shows a flow chart for explaining an IC-card-certificate-confirmation method according to the present invention.

At the next associated IC-card-certificate-confirmation step 7007, a certification process certifying that an IC card is connected to an IC-card terminal is performed through the preparation and the verification of a certificate of an IC card. The details of the above is shown in FIG. 12.

At step 12001, the elements in the forward association link of n is set in a variable p. At this time, the number of elements in the forward association link of n is 1 according to the selection of a user. At the next judgment step 12002, investigation is made whether the certification type of n 17008 is "certification" or not, and in a case where it is, at ID-card-random-number-obtainment step 12003, by means of IC-card-random-number-obtainment means 12004, the random number produced by IC-card-random-number-production means 3077 of an IC card shown by an IC-card-connection # 17003 is obtained. At IC-card-certificate-obtainment step 12004, the obtained IC-card-random number is injected into an IC-card-certificate-production means 3008 of an IC card shown by an IC-card-connection # 17003 of p by means of an IC-card-certificate-obtainment means 2007, and an IC-card certificate produced by an IC-card-certificate-production means 3008 is obtained. At certificate-verification step 12005, the obtained IC-card certificate is injected into an IC-card-certificate-verification means 3009 of an IC card shown by an IC card-connection # 17003 of n by means of the IC-card-certificate-verification means 2006, and the result of verification is obtained. When the verification is completed at result-set step 12007, the result is regarded as "confirmed", and when the verification is not performed, at result-set step 12008, the result is expired. And the control is returned to step - - - .

At judgment step 7008, investigation is made whether the results at respective steps: IC-card-availability-confirmation step 7004, IC-card-application-availability-confirmation step 7005, associated-IC-card-application-availability-confirmation step 7006, associated-IC-card-certificate-confirmation step 7007 show "confirmed" or not, and when the results are not "confirmed", process is terminated through a stop step 7011, and when the results are "confirmed", at step 7009 1 is added to the loop-control-variable n, and process is returned to loop-termination-judgment step 7002.

After the execution of availability confirmation of IC-card applications and IC cards have been performed in steps, from 7001 to 7009, at service execution step 7010, IC-card applications stored in an IC-card-application-storage means of every IC card execute services by means of an IC-card-application-execution means 3011.

The process for providing IC-card services is finished with the explanations in the above.

<<An Example of a Method of Obtaining PIN>>

Figure 13:
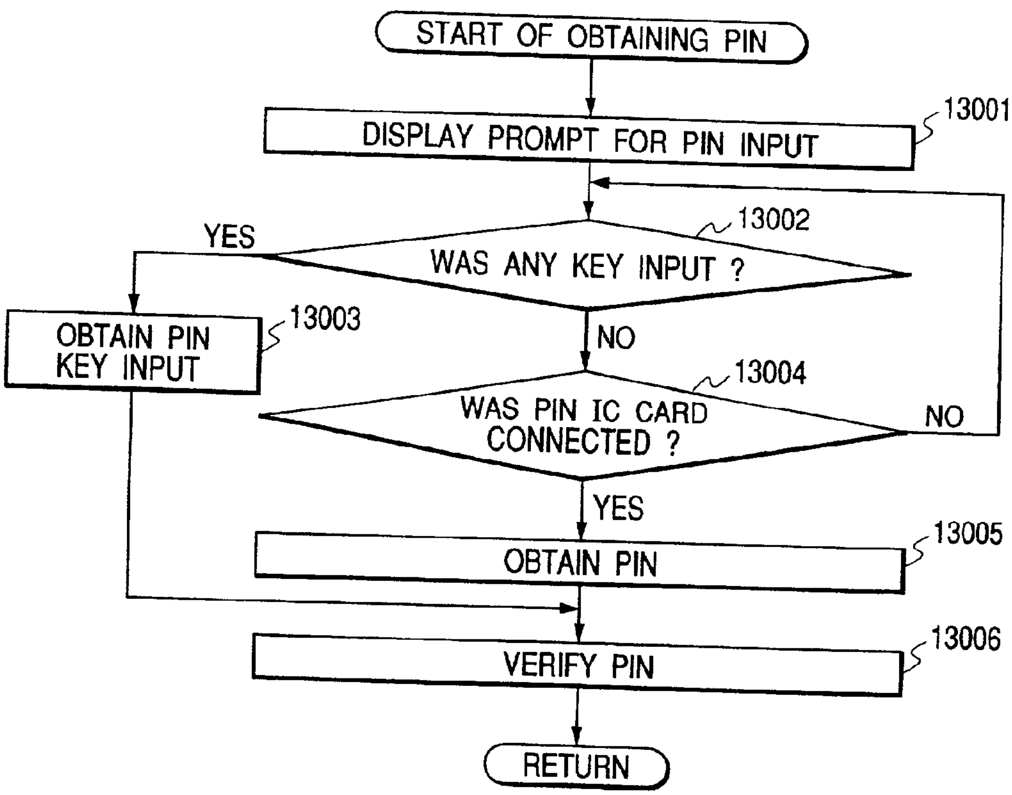
FIG. 13 shows a flow chart for explaining an obtainment method of a private-identification number according to the present invention.
Figure 14:
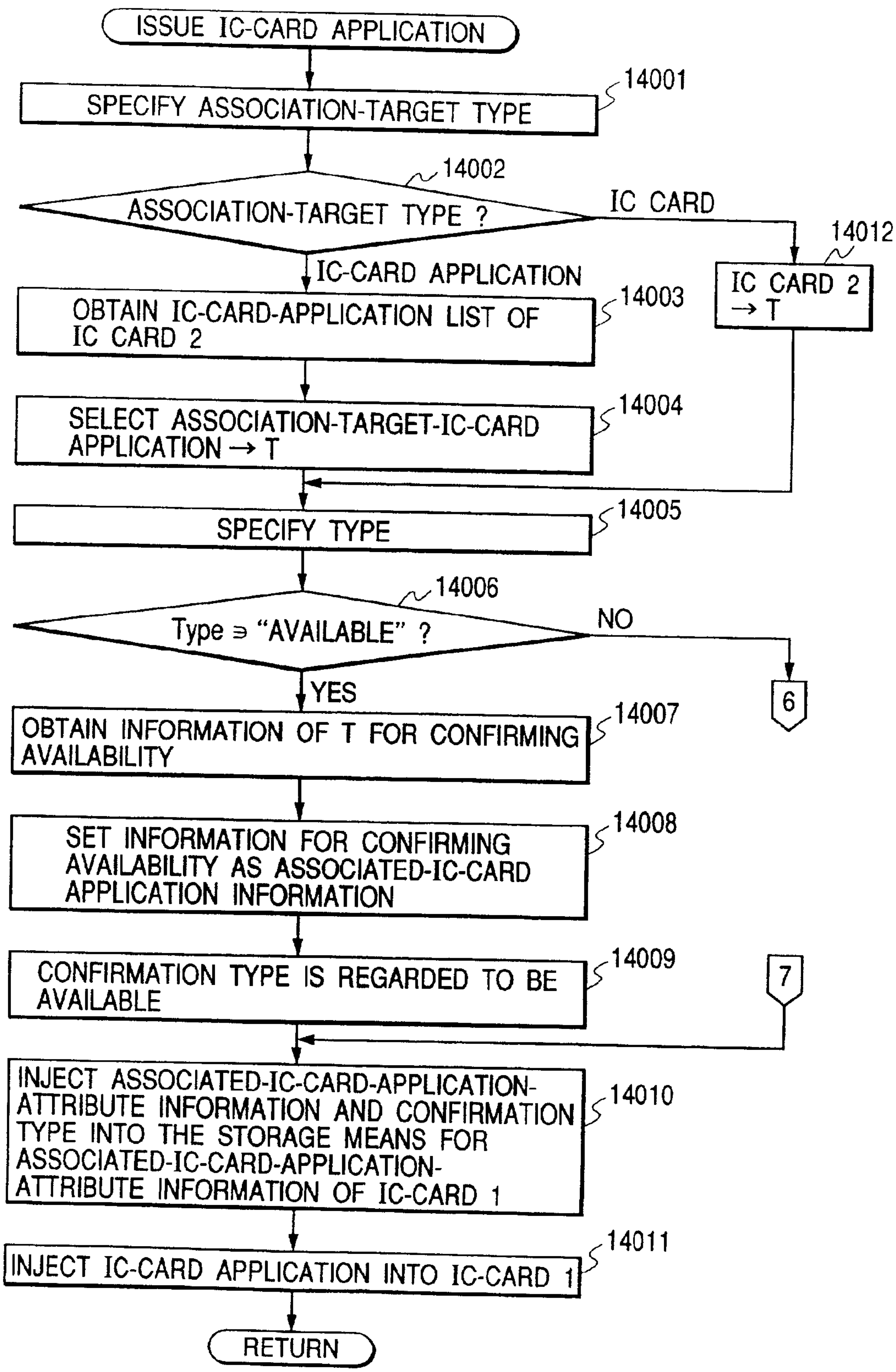
FIG. 14 shows a part of the flow chart of an example of an IC-card-application-issue method according to the present invention.

The method of obtaining a PIN will be explained referring to FIG. 13, in a case where the input of one's PIN is requested for the confirmation of the IC-card holder's justification during the execution of an IC-card service. The process shown in FIG. 13 is started when the input of a PIN is requested and operated by the means for obtaining a PIN 2016.

At a step of displaying prompt for a PIN input 13001, necessary information is displayed in a display means 2002. Next, in a case where there is a key input through the operation of a key-input means 2010 at judgment step 13002, the PIN is obtained from the key input at PIN-key-input-obtaining step 13003, and the process proceeds to PIN-verification step 13006. In a case where there is no key input, at judgment step 13004, investigation is made to see if an IC card provided with PIN-storage means 3012 is connected to an IC card being connected to an IC-card terminal 1002, and when there is such a card, at a PIN-obtaining step 13005, the PIN is obtained from the PIN-storage means 3012. After that, the process proceeds to PIN-verification step 13006. After that, control is returned to the execution of an IC-card service. The investigation to see if an IC card provided with a PIN-storage means 3012 is connected to an IC card being connected to an IC-card terminal 1002 can be realized by ATR (answer to reset) or by the definition of a command made for the purpose of the investigation.

<An Example of an Issue Method of an IC-Card Application>

The issue method of an IC-card application will be explained, the application which is to be used in the above-mentioned IC-card-service-provision method.

FIG. 4 is a drawing showing the configuration of an IC-card-application issue apparatus 4001 in which the IC-card-application-issue method according to the present invention is operated. A control means 4003 controls respective means in an IC-card-application-issue apparatus 4001, and it is connected to a first IC card 4007 and a second IC card 4008 through an IC-card-communication means 4006. The first IC card 4007 is the issue target of an IC-card application, and the second IC card is the association target. About the other means, explanation will be given in the explanation of flow charts described later as occasion demands. The configurations of respective IC cards are identical to those shown in FIG. 3. FIGS., 14 and 15, show flow charts showing the issue method of IC-card applications according to the present invention.

At association-target-type-specifying step 14001, a user designates an "IC card" or an "IC-card application" through the key-input means 4009. When the association-target type is an "IC card", through association-target-type-judgment step 14002, at step 14012 the second IC card 4008 is set in an association-target-variable T. When the association-target type is an "IC-card application", at IC-card-application-list-obtainment step 14003, by means of an obtainment means of IC-card-application-list and attribute information 4011, an IC-card list is obtained which is stored in a storage means for IC-card-application list and attribute information 3005 of the second IC card 4008, and at association-target-IC-card-application-selection step 14004, the list is displayed in the display means 4002, and the selection by a user is accepted with the key input means 4009 and the IC-card application selected by the user is set in the association-target variable T.

Next, at type-specifying step 14005, the designation of type by a user is accepted through the key input means 4009. In the designation of a type, any one out of "availability", "certification" and "normal" is selected.

In a case where the designated type is "availability", at information obtainment for availability confirmation step, 14007 through type-judgment step 14006, the information for availability confirmation of the association-target-variable T is obtained. In a case where T is an IC card, the information for availability confirmation is obtained from an IC-card-attribute-storage means 3004 by means of the IC-card-attribute-information-obtainment means 4005. In a case where T is an IC-card application, the information for availability confirmation is obtained from the storage means for IC-card application-list and attribute information 3005 by means of an IC-card-application list and attribute-information obtainment means 4011.

The information for availability confirmation obtained at associated IC-card-application-attribute-information-set step 14008 is regarded as an associated-IC-card-application-attribute information, and at confirmation-type-set step 14009, the confirmation type is judged to be available.

At the next associated IC-card-application-attribute-information-injection step, an IC-card-application name issued by a first IC card 4007 and a second IC card 4008 or an associated-IC-card-application-attribute information, a confirmation type, which designates an IC-card application are injected into an associated-IC-card-application-attribute-information-storage means 3006 by means of an associated-IC-card-application-attribute-information-injection means 4010. The format of the contents to be stored in an associated-IC-card-application-attribute-information-storage means 3006 is the same as shown in FIG. 16.

In a case where the designation at type-specifying step 14005 is not "availability", at an association-condition-attribute-information-specifying step 15001, through type-judgment step 14006, the designation of attribute information of T which is to be an association condition is accepted through the Key input means 4009.

When T expresses an IC card, an item or more than 2 items among the items cited in the following are accepted: an IC-card ID, an IC-card public key, the name or ID of a card holder, the name or ID of an IC-card issuer, the name or ID of an IC-card manufacturer. When T expresses an IC-card application, an item or more than 2 items among the items cited in the following are accepted: a public key of an IC-card application, a name or ID of an IC-card application, that is called AID (application identifier), a manufacturer's name or ID of an IC-card application, a issuer's name or ID of an IC-card application, that is called RID (registered application provider identifier). At an attribute-information-extraction step 15002, designated information is extracted. When T expresses an IC card, an attribute information is obtained from the IC-card-attribute-information-storage means 3004 by means of an IC-card-attribute-information-obtainment means 4005. When T expresses an IC-card application, an attribute information is obtained from the IC-card-application list and attribute-information storage means 3005 by means of the IC-card-application list and attribute information-obtainment means 4011. And at the next an associated-IC-card-application-attribute-information-set step 15003, the extracted information is considered to be an associated-IC-card-application-attribute information.

When the type is found to be "certification" at the next judgment step 15004, at confirmation-type-set step 15005, a confirmation type is made "certification", if not, at confirmation-type-set step 15006, a confirmation type is made "normal", and process proceeds to associated-IC-card-application-attribute-information-injection step 14010. About associated-IC-card-application-attribute-information-injection step, explanation has been performed in the previous page.

At the next IC-card-application-injection step 14011, an IC-card application is injected to the first IC card 4007, and the process of issuing an IC-card application is completed.

In the above, an embodiment according to the present invention is explained in detail. By the application of the present invention, for example, following merits can be expected.

There has been a problem as shown below: it has been necessary to memorize the PIN for a IC card holder, and often he forgets it, or he uses a number which can be easily presumed by others and it has been difficult to fulfill the function as a PIN; however owing to the present invention, the necessity to memorize one's PIN has been removed.

In the past, there has been a problem that to set conditions concerning the combination of IC cards is impossible; however, it is made possible to set conditions about associated operation of IC cards by the present invention. Thereby, the contents of point services in a shopping district have been diversified, and it became possible to give incentives to customers for shopping, for example, customers are recommended to have a plurality of IC cards and at a certain condition of the combination of IC cards points are doubled.

Concerning the utilization of public facilities by the residents of neighboring self-governing body, on the assumption that they have their resident cards issued by the neighboring self-governing body, the present invention has made it possible to issue IC cards for the utilization of public facilities.

In a case where administration entries are electronically processed, when a plurality kinds of appending documents are requested, it has been realized to prescribe the reliance between appending documents and an entry electronically; thereby the errors in such a business as mentioned in the above have been removed and the efficiency of the business has been improved.

The present invention is concerned a variety of fields, so that various kinds of forms of embodiments will be cited in the following.

A first embodiment denotes an IC-card-service-provision method, and the details are explained in the following: a first IC card stores a first IC-card applications, and when the first IC card is connected to an IC-card terminal electrically or electromagnetically, the first IC-card application is started to operate on the first IC card, and/or a first terminal program corresponding to the first IC-card application, and/or a server program are started to operate, Thus, IC-card services can be provided by these operations.

Assuming that there are a second IC-card applications having different functions from those of the first IC-card applications and a second IC card which stores them;

an associated-IC-card-application-attribute-information-storage means is provided inside the first IC card for storing the attribute information of the second IC card, and/or the attribute information of the second IC-card applications; and following steps are provided: IC-card-application-list-obtainment step to obtain an IC-card-application list of every IC card, associated-IC-card-application-attribute-information-obtainment step to obtain attribute information of every IC card stored in an associated-IC-card-application-attribute-information-storage means, a judgment step to judge if the second IC card is connected to the IC-card terminal electrically or electromagnetically, the second IC card which coincide with the attribute information stored in the associated-IC-card-application-attribute-information-storage means by means of the analysis of reliance based on the attribute information stored in the associated-IC-card-application-attribute-information-storage means, and/or an associated-IC-card-application-attribute-information-collation step for judging if the second IC-card-application which coincide with the attribute information is stored in the first IC card or in the second IC card.

A second embodiment denotes an IC-card-service provision method: in which a list display of executable IC-card applications is shown in the display of an IC-card terminal for users, and the selection of an IC card by a user is accepted and an IC card service by the selected IC-card application is executed; and the steps as mentioned below are provided: an associated-IC-card-application-list-composition step to make an IC-card-application-list display by composing an IC-card-application list obtained from every IC card, and an associated-IC-applications-narrowing step in which the list of selectable IC-card-application is displayed and the selection is accepted based on the reliance predicated on the attribute information stored in the associated-IC-card-application-information-storage means of every IC card.

A third embodiment denotes the issue method of IC-card applications. In an issue method of IC-card applications being provided with a step to make a first IC-card application stored in a first IC card, following steps are provided: an association-target-specifying step in which a second IC card and/or an IC-card application stored in the second IC card are designated as an association target of an IC-card application to be stored in the first IC card, association-target-attribute-information-xtraction step in which the attribute information of an IC card and or the attribute information of an IC-card application as the attribute information of an association target are extracted from the second IC card, and an associated-IC-card-application-at-tribute-information-injection step in which the extracted attribute information of the association target is stored in an associated-IC-card-application-attribute-information-storage means in the first IC card.

A fourth embodiment denotes a provision method of IC-card services utilizing an IC card to be used for authentication in which an associated-IC-card-application-availability-confirmation step is provided such as the steps as shown below: step of inquiring a server connected to an IC-card terminal about the availability of a first IC card connected to the IC-card terminal electrically or electromagnetically, step of inquiring a server connected to the IC-card terminal about the availability of a first IC-card application stored in the first IC card, and an execution step of executing the IC-card application when the result of inquiry is availability, and in the above-mentioned IC-card service provision method, the information which is a part of attribute information of the second IC card and also being the information for IC-card-availability confirmation which is necessary for inquiring the server about the availability of the second IC card, and/or the information being a part of the attribute information of the second IC-card application and also the information for IC-card application-availability confirmation which is necessary for inquiring the server about the availability of the second IC-card application are stored in the associated-IC-card-application-attribute-information-storage means inside the first IC card.

And before the execution of the first IC-card application, the server is inquired about the availability of the second IC card by means of the information for an IC-card-availability confirmation of the second IC card stored in the associated-IC-card-attribute-information-storage means inside the first IC card, and/or the server is inquired about the availability of the second IC-card application by means of the information for an IC-card application availability confirmation of the second IC-card stored in the associated-IC-card-program-attribute-storage means inside the first IC card.

A fifth embodiment denotes an IC card utilizing an IC card for authentication which is utilized in the IC-card-service-provision method in which services are provided by the connection of a first IC card to an IC-card terminal, and an associated-IC-card-application-attribute-information-storage means which stores attribute information of a second IC card and/or the attribute information of an IC-card application stored in a second IC card is provided inside the first IC card.

A sixth embodiment denotes an IC card terminal which provides services by the connection of a first IC card to the terminal electrically or electromagnetically, the IC card which stores the first IC-card applications. The IC-card terminal comprises the means explained below. An IC-card-application-list-obtainment means for obtaining an IC-card-applications list of every IC card being connected to the IC terminal electrically or electromagnetically, an associated-IC- card-application- attribute-information-obtainment means for obtaining attribute information from an associated-IC-card-application-attribute-information-storage means of every IC card, an associated-IC-card-application-attribute-information-collation means for judging a second IC-card application which coincide with an attribute information stored in the associated-IC-card-application-attribute-information-storage means is stored in the first IC card or in the second IC card by the analysis of the reliance relation based on the attribute information stored in the associated-IC-card-application-attribute-information-storage means, an associated-IC-card-application-list-composition means for producing a list display of an IC-card application by the composition of the IC-card-application list stored in the first IC card and the IC-card-application list stored in the second IC card, and an IC-card-application narrowing means in which the list of selectable IC-card application based on the reliance relation predicated upon the attribute information is displayed and the selection can be accepted.

A seventh embodiment denotes an IC-card-service-provision method in which a first IC card, which stores a first-IC-card-applications, is connected to an IC card terminal electrically or electromagnetically, and a request for a first IC-card holder is displayed requesting a key input of his PIN to the IC-card terminal for the confirmation that he is a legitimate holder, and after the key input of his PIN, services are provided; and PIN obtainment step is provided in which while the key input of his PIN is prompted, the information of his PIN is obtained from a second IC card, and the obtainment of the information is regarded that his key input has been done.

An eighth embodiment denotes an IC-card terminal utilizing an IC card for authentication in which a PIN obtainment means is provided and a first IC card which stores a first IC-card application is connected to the IC-card terminal electrically or electromagnetically, and a request for a first IC-card holder is displayed requesting the key input of his PIN to the IC-card terminal to certify that he is a legitimate IC-card holder, and after the key input of his PIN, services are provided; and while the key input is waited for, the information of his PIN can be obtained from a second IC card, and the obtained information is regarded that the key input of his PIN has been done.

A ninth embodiment denotes a method for providing IC card services to the public utilizing an IC card for authentication by connecting a first IC card, which stores first IC-card applications, to an IC-card terminal, and comprises the steps as shown in the following:

random number production step for producing random numbers in the first IC card, certificate production step for producing certificates using an inherent information to the second IC card, and certificate verifying step in which the certificate is sent to a first IC card in order to justify the certificate.

A tenth embodiment denotes an IC-card terminal which provides services by the connection of the first IC card, in which a first IC-card application is stored, to the IC-card terminal and in which steps are provided as shown in the following:

a random number production means for producing random numbers in the first IC card, a certificate production means for producing certificates by sending the random number to the second IC card and using the information inherent to the second IC card, and a certificate-verification means for verifying the justification of a certificate by sending it to the first IC card.

An eleventh embodiment denotes a provision method of IC-card-services utilizing an IC card for authentication as described in claim 1 and claim 2, and as the attribute information of a second IC card, 1 item or more than 2 items out of the information shown below: an IC-card ID, an IC-card public key, the name or ID of a card holder, the name or ID of a card issuer, and the name or ID of a card manufacturer, and/or as the attribute information of second IC-card applications, 1 item or more than 2 items out of the information shown below: a public key of the IC-card application, the name or ID of an IC-card application, AID (application identifier), the name or ID of a manufacturer of an IC-card applications, and the name or ID of an issuer of IC-card applications. RID (registered application provider identifier), are stored in the associated-IC-card-application-attribute-information-storage means of the first IC card.

A twelfth embodiment denotes the IC-card application issue method described in the third embodiment, and as the attribute information of the second IC card, 1 item or more than 2 items are extracted out of the following pieces of information: an IC-card ID, the public key of an IC card, the name or ID of a card holder, the name or ID of an IC card issuer, and the name or ID of an IC card manufacturer, and/or as the attribute information of a second IC-card application, the public key of an IC-card application, the name or ID of an IC card, AID (application identifier), the name or ID of a manufacturer of an IC-card application, the name or ID of an IC-card application issuer, RID (registered application provider identifier), etc.

A thirteenth embodiment denotes an IC card utilizing an IC card for authentication described in the fifth embodiment, in which as the attribute information of a second IC card 1 item or more than 2 items out of the following information: an IC card ID, the public key of an IC card, the name or ID of a card holder, the name or ID of an issuer, the name or ID of a card manufacturer, and/or as the attribute information of a second IC-card application, the public key of an IC-card application, the name or ID of an IC-card application, AID (application identifier), and the name or ID of a manufacturer of an IC-card application, and the name or ID of a manufacturer of an IC-card applications, RID (registered application provider identifier) are stored in an associated-IC-card-application-attribute-information-storage means.

In the present invention, necessary data for receiving a variety of kinds of services are stored in a plurality of IC cards, and by the use of these cards in associated manners the loads of users can be largely lightened.

What is claimed is:

1. A method of providing IC-card service comprising:

obtaining information of applications stored in a first IC card, and attribute information which designates an application in association with each of said applications stored in said first IC card;

obtaining information of applications stored in other IC cards;

analyzing a reliance relation between said applications stored in said first IC card and the other IC cards by collating said attribute information;

deciding a combination of applications stored in said first IC card and the other IC cards according to said analysis; and executing each application stored in said first and the other IC cards of the combination for providing service.

2. A method of providing IC-card service according to claim 1, further comprising:

synthesizing a list of said applications stored in said one IC card and the other IC card from said attribute information.

3. A method of providing IC-card service according to claim 1, wherein each of said attribute information designates said plurality of applications.

4. A method of providing IC-card service according to claim 1, wherein said attribute information is variable.

5. A method of providing IC-card service according to claim 1, wherein said attribute information further designates a confirmation type which describes a confirmation method.

6. A method of providing IC-card service according to claim 5, further comprising:

confirming availability of each application of said combination if confirmation type is available.

7. A method of providing IC-card service according to claim 5, further comprising:

producing a random number in said first IC card;

sending said random number to the other IC cards;

producing a certificate by the use of the random numbers;

sending said certificate to said first IC card; and confirming the validity of the certificate inside said first IC card.

8. A method of providing IC-card service according to claim further comprising:

requesting a user to input a personal identification number; and verifying the personal identification number that is input.

9. An IC-card terminal comprising:

a card connection member which connects to a plurality of IC cards electrically or electromagnetically;

a reader for reading information of applications stored in a first IC card and other IC cards, and attribute information which designates an application in association with each of said applications stored in said first IC card;

means for analyzing a reliance relation between said applications stored in said first IC card and the other IC cards by collating said attribute information;

means for deciding a combination of applications of said first IC card and other IC cards according to said analysis; and means for executing each application of said first and other IC cards of the combination for providing service.

10. An IC-card terminal according to claim 9, further comprising:

means for synthesizing a list of said applications stored in said one IC card and the other IC cards from said attribute information.

11. An IC-card terminal according to claim 9, further comprising:

a display displaying said applications of executable combination.

12. An IC-card terminal according to claim 9, wherein each of said attribute information designates said plurality of applications.

13. An IC-card terminal according to claim 9, wherein said attribute information is variable.

14. An IC-card terminal according to claim 9, wherein said attribute information further designates a confirmation type describing a confirmation method.

15. An IC-card terminal according to claim 14, further comprising:

means for confirming availability of each application of said combination if confirmation type is available.

16. An IC card comprising:

means for storing applications and attribute information which designates applications in association with each of said applications;

means for obtaining information of applications stored in other IC cards; and means for synthesizing a list of said applications stored in said IC card and the other IC cards from said attribute information.

17. An IC according to claim 16, further comprising:

means for analyzing a reliance relation between said applications stored in said IC card and the other IC cards by collating said attribute information; and means for deciding a combination of applications of said IC card and the other IC cards according to said analysis.

18. An IC card according to claim 16, wherein said attribute information is at least one of a public key of an IC-card application, a name of an IC-card application, an ID of an IC-card application, a name of a manufacturer of an IC-card application, an ID of a manufacturer of an IC-card application, a name of an issuer of an IC-card application, and an ID of an issuer of an IC-card application.

19. An IC card according to claim 16, wherein each of said attribute information designates said plurality of applications.

20. An IC card according to claim 16, further comprising:

means for confirming availability of each application of said combination if confirmation type is available.

* * * * *